(12) United States Patent
Surendran et al.

(10) Patent No.: US 11,775,718 B2
(45) Date of Patent: *Oct. 3, 2023

(54) METHODS AND APPARATUS TO SIMULATE METASTABILITY FOR CIRCUIT DESIGN VERIFICATION

(71) Applicant: TEXAS INSTRUMENTS INCORPORATED, Dallas, TX (US)

(72) Inventors: Sudhakar Surendran, Bangalore (IN); Venkatraman Ramakrishnan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,842

(22) Filed: Dec. 1, 2022

(65) Prior Publication Data

US 2023/0088503 A1 Mar. 23, 2023

Related U.S. Application Data

(63) Continuation of application No. 17/246,136, filed on Apr. 30, 2021, now Pat. No. 11,531,798.

(30) Foreign Application Priority Data

Feb. 24, 2021 (IN) .............................. 202141007687

(51) Int. Cl.
*G06F 30/3312* (2020.01)
*G06F 30/327* (2020.01)
(Continued)

(52) U.S. Cl.
CPC ........ *G06F 30/3312* (2020.01); *G06F 30/327* (2020.01); *G06F 30/367* (2020.01);
(Continued)

(58) Field of Classification Search
CPC .. G06F 30/3312; G06F 30/327; G06F 30/367; G06F 30/398; G06F 2119/02; G06F 2117/04
(Continued)

(56) References Cited

U.S. PATENT DOCUMENTS

| | | |
|---|---|---|
| 8,769,448 B1 | 7/2014 | Sundararajan et al. |
| 10,060,976 B1 | 8/2018 | Singh et al. |

(Continued)

OTHER PUBLICATIONS

Datta et al., "Modeling and Characterization of Metastability in Single Flux Quantum (SFQ) Synchronizers", https://arxiv.org/pdf/2004.04804.pdf, Apr. 9, 2020, 5 pages. (Year: 2020).

(Continued)

*Primary Examiner* — Phallaka Kik
(74) *Attorney, Agent, or Firm* — Mandy Barsilai Fernandez; Frank D. Cimino

(57) ABSTRACT

Methods, apparatus, systems and articles of manufacture are disclosed to simulate metastability for circuit design verification. An example apparatus includes an input handler to receive circuit design data indicative of a circuit design, a circuit modeler to generate a simulation model based on the circuit design data, a simulator to simulate operation of the circuit design based on the simulation model, a metastability injector to insert metastability logic into the simulation model during the simulation, and a metastability controller to control the metastability logic during the simulation.

20 Claims, 13 Drawing Sheets

(51) Int. Cl.
  *G06F 30/367* (2020.01)
  *G06F 30/398* (2020.01)
  *G06F 119/02* (2020.01)
  *G06F 117/04* (2020.01)

(52) U.S. Cl.
  CPC ........ *G06F 30/398* (2020.01); *G06F 2117/04* (2020.01); *G06F 2119/02* (2020.01)

(58) Field of Classification Search
  USPC .................... 716/108, 113, 136, 104; 703/16
  See application file for complete search history.

(56) References Cited

U.S. PATENT DOCUMENTS

| | | | |
|---|---|---|---|
| 11,531,798 B2* | 12/2022 | Surendran | ........... G06F 30/3312 |
| 2004/0236559 A1 | 11/2004 | Chen | |
| 2005/0102572 A1 | 5/2005 | Oberlaender | |
| 2005/0268265 A1 | 12/2005 | Ly et al. | |
| 2006/0282225 A1 | 12/2006 | Sunshine et al. | |
| 2007/0244685 A1 | 10/2007 | Ja et al. | |
| 2008/0072188 A1 | 3/2008 | Ja et al. | |
| 2020/0302314 A1 | 9/2020 | Muroya et al. | |

OTHER PUBLICATIONS

Chen et al., "A Comprehensive Approach to Modeling, Characterizing and Optimizing for Metastability in FPGAs", ACM, Feb. 21-23, 2010, 10 pages. (Year: 2010).

Friedrichs et al., "Metastability-Containing Circuits", IEEE Transactions on Computers, vol. 67, No. 8, Aug. 2018, pp. 1167-1183. (Year: 2018).

* cited by examiner

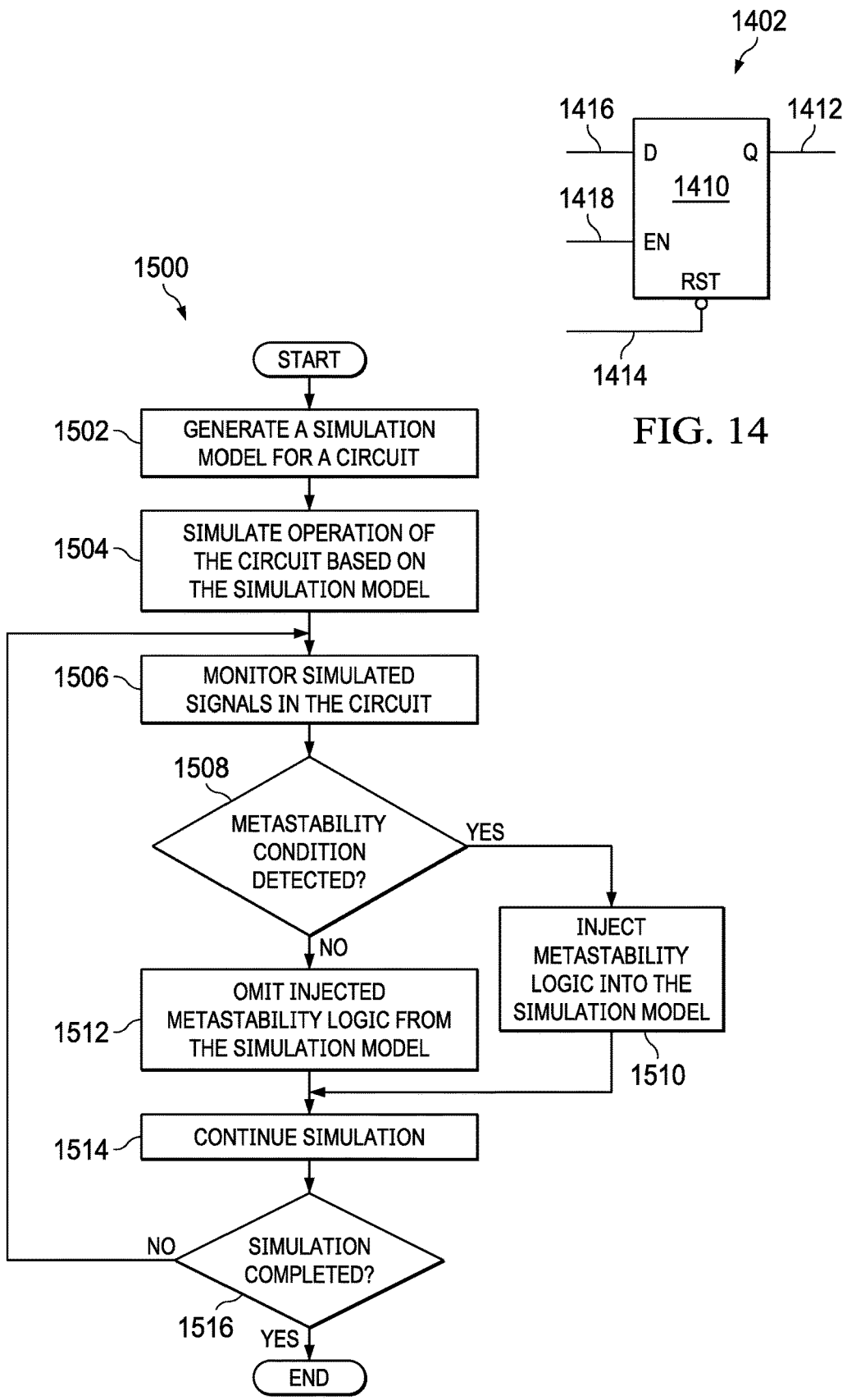

US 11,775,718 B2

1

METHODS AND APPARATUS TO SIMULATE METASTABILITY FOR CIRCUIT DESIGN VERIFICATION

RELATED APPLICATIONS

This application is a continuation of U.S. patent application Ser. No. 17/246,136, now U.S. Pat. No. 11,531,798, filed Apr. 30, 2021, which claims priority from Indian Patent Application No. 202141007687 filed on Feb. 24, 2021, the entirety of each of which is incorporated herein by reference.

FIELD OF THE DISCLOSURE

This disclosure relates generally to circuit design verification and, more particularly, to methods and apparatus to simulate metastability for circuit design verification.

BACKGROUND

Circuit design verification systems, such as Electronic Design Automation (EDA) software tools, can be used to verify performance and/or functionality of a circuit design. For example, a circuit design verification system can perform a register transfer level (RTL) simulation of a circuit described using a hardware description language (e.g., VHDL, Verilog).

BRIEF DESCRIPTION OF THE DRAWINGS

FIG. 14 is a partial schematic illustration of an example implementation of the example circuit of FIG. 3 that includes a latch.

FIG. 15 is a flowchart representative of machine readable instructions which may be executed to implement the example design verifier of FIG. 1 and/or the example metastability generator of FIG. 2.

Figure 1:
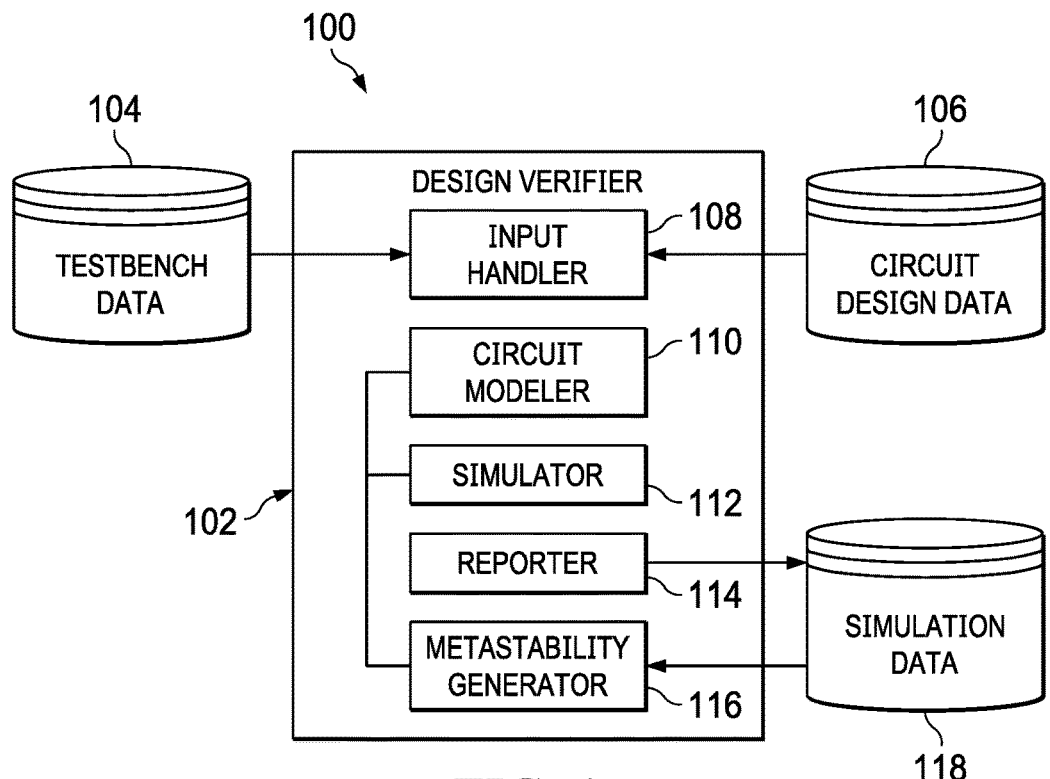
FIG. 1 illustrates an example simulation environment in which an example design verifier includes an example metastability generator constructed in accordance with teachings in this disclosure to simulate metastability for circuit design verification.

The figures are not to scale. Instead, certain regions may be enlarged in the drawings. Although the figures show regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Some digital circuit components, such as registers, flip-flops, etc., are synchronized to a clock to perform a certain logical function (e.g., update an output to correspond to an input) in a cyclical manner (e.g., each time a positive edge of an input clock signal is detected, etc.). In some examples, different portions of a circuit are clocked by different clocks that have different clock frequencies and/or relative phases. As such, asynchronous signals (e.g., clock domain crossing (CDC) signals, reset domain crossing (RDC) signals, etc.) sometimes arrive at unpredictable times relative to an active clock edge of a receiving component. Moreover, in some instances, a logic state transition of an asynchronous signal near the active clock edge (e.g., within a setup/hold window) may cause the receiving component to enter a metastable state in which time needed for an output of the receiving component to resolve is unpredictable.

Some examples disclosed herein account for such unpredictability when simulating operation of a circuit design (e.g., RTL simulation). One example method includes simulating an impact of metastability by injecting metastability logic (e.g., synchronizer, etc.) into a simulation model of a circuit to mimic a random cyclic delay (e.g., a delay of 0 clock cycles, 1 clock cycle, 2 clock cycles, 3 clock cycles, etc.) expected when an asynchronous signal is received at an input of a clocked component. Further, the injection (and/or removal) of the metastability logic may be controlled dynamically and/or conditionally during the simulation.

In some scenarios, the input to the clocked component may become predictable due to a design behavior of one or more components of the circuit. In one example scenario, a source domain portion of the circuit that provides a signal to a destination domain portion of the circuit is coupled to a gated clock signal. In this example, the gated clock signal selects one of: the same clock as the destination domain, or a different clock than that of the destination domain. In this example, injecting metastability logic when the same clock is selected may be less accurate than when a different clock is selected because it may distort results of the simulation unnecessarily during time periods when the signal is not a domain crossing signal. More generally, in various scenarios, a metastability or unpredictability condition may only occur intermittently depending on design behavior specific to the circuit design.

Accordingly, in some examples, the method includes modeling metastability effects dynamically (and/or conditionally) during a simulation based on one or more of: a selected clock path in the circuit design, other design behavior of components in the circuit design, a quantity of asynchronous signals crossing from a same source domain into a destination domain, and/or varying clock signal characteristics. In some examples, the method additionally or alternatively includes dynamically modeling metastability effects at boundary ports of interacting intellectual property (IP) cores/blocks. In some examples, the method additionally or alternatively includes dynamically modeling metastability effects on reset synchronizers.

FIG. 1 illustrates an example simulation environment 100 in which an example design verifier 102 includes an example metastability generator 116 constructed in accordance with teachings in this disclosure to simulate metastability for circuit design verification. In the illustrated example of FIG. 1, the example simulation environment 100 includes example testbench data 104, example circuit design data 106, the example design verifier 102, and example simulation data 118.

The example testbench data 104 includes input data for stimulating a simulated model of a circuit design. For example, the example testbench data 104 includes a pattern of input signals, control signals (e.g., clock signals), etc., that are provided to the simulated model of the circuit design during a simulation. In some examples, the testbench data 104 is input by a user in a hardware definition language (HDL) format (e.g., VHDL, Verilog, etc.).

The example circuit design data 106 describes a circuit design for verification by the example design verifier 102. In some examples, the description of the circuit design indicated by the example circuit design data 106 is input by a user in an HDL format (e.g., VHDL, Verilog, etc.).

In the illustrated example of FIG. 1, the example design verifier 102 includes an example input handler 108, an example circuit modeler 110, an example simulator 112, an example reporter 114, and an example metastability generator 116. In some examples, the example design verifier 102 is implemented as simulation software executed on a computing device (e.g., personal computer, desktop computer, laptop computer, etc.).

The example input handler 108 receives the example testbench data 104 and the example circuit design data 106 input by a user. In some examples, the example input handler 108 stores the input by the user in the example testbench data 104 and/or the example circuit design data 106. Additionally or alternatively, in some examples, the example input handler 108 retrieves the input by the user from the example testbench data 104 and/or the example circuit design data 106.

The example circuit modeler 110 generates a simulation model of the circuit design described by the example circuit design data 106. In some examples, generating the simulation model includes the example circuit modeler 110 generating a gate level description (e.g., RTL description, etc.) of the circuit design.

The example simulator 112 simulates operation of a circuit design (e.g., described by the circuit design data 106) according to a simulation model (e.g., generated by the circuit modeler 110). In some examples, the example simulator 112 simulates the operation of the circuit design by simulating input signals (e.g., a pattern of digital signal transitions, etc.) and/or control signals (e.g., clocks, resets, etc.) and simulating expected output signals of various components in the circuit design in response to the input signals and/or the control signals.

The example reporter 114 monitors simulated states of signals (e.g., at different nodes, etc.) in the simulated model of the circuit during the simulation, and stores (e.g., as the example simulation data 118) data representative of the various signals.

To that end, the example simulation data 118 includes an indication of an evolution, over time, of logical states of a given signal (e.g., output by a register, etc.) at a node in a circuit stimulated by the example testbench data 104. In some examples, the example simulation data 118 also includes similar simulation data for a plurality of signals associated with different nodes in a simulated circuit model over time.

In some examples, the example reporter 114 additionally or alternatively outputs an indication of timing violations and/or other errors detected during the simulation. For example, when a simulated electronic component (e.g., register, etc.) of the circuit design is expected to provide an output at an unpredictable time when an input is received near (e.g., with a setup window threshold or hold window threshold from an active clock edge of the electronic component), then the example reporter 114 stores an indication of a timing violation (e.g., setup violation, hold violation, etc.) for the electronic component in the example simulation data 118.

The example metastability generator 116 dynamically injects metastability logic into and/or out of the simulation model of the circuit design during the simulation. In some examples, the injected metastability logic includes a representation of circuitry that is inserted into the circuit design to model a pseudo-random delay at an input or output of a digital component of the circuit design (during the simulation) associated with an expected uncertainty in a timing of the output when the circuit design is implemented as a physical device. Alternatively or additionally, in some examples, injecting the metastability logic includes the metastability generator 116 adjusting a timing violation threshold (e.g., setup window, hold window, etc.) used by the example reporter 114 to identify potential timing violations for domain crossing signal(s) between a first portion of the circuit design and a second portion of the circuit design.

Figure 2:
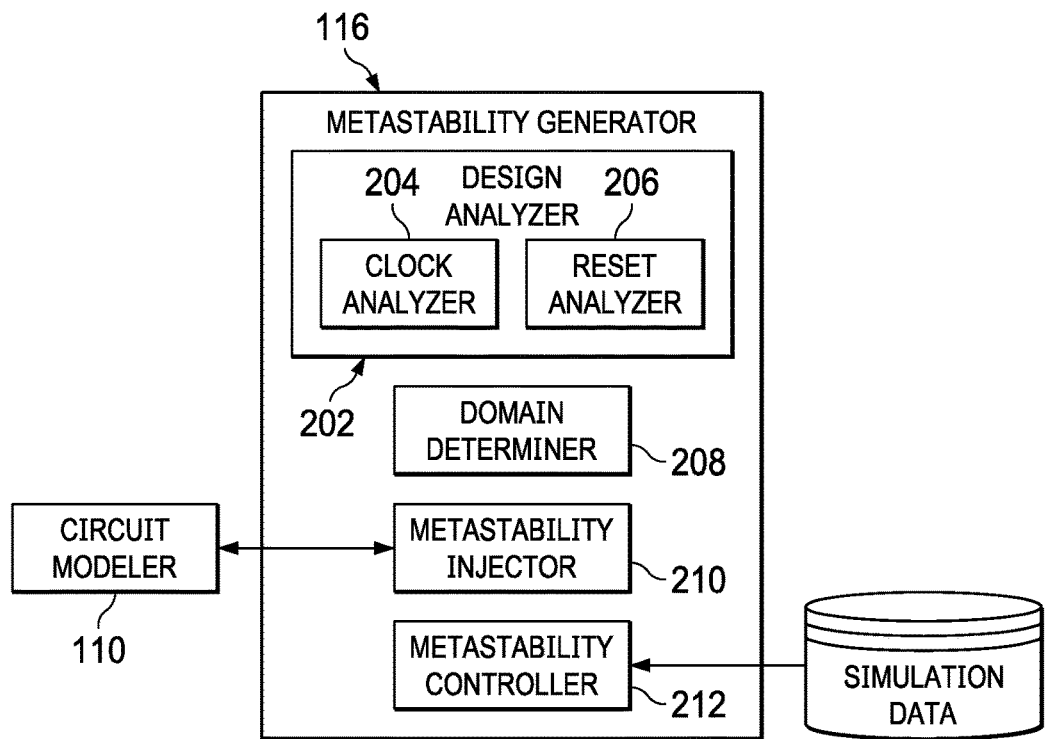
FIG. 2 illustrates an example implementation of the example metastability generator of FIG. 1.

FIG. 2 illustrates an example implementation of the example metastability generator 116 of FIG. 1. In the illustrated example of FIG. 2, the example metastability generator 116 includes an example design analyzer 202, an example domain determiner 208, an example metastability injector 210, and an example metastability controller 212.

The example design analyzer 202 identifies portions of the circuit design that may trigger an uncertainty, unpredictability, and/or metastability of an input signal (e.g., data, reset, clock, etc.) of a clocked component in the circuit design.

As a first example, if an output of a comparator is connected (directly or indirectly) to a data input of a register, the output of the comparator could be resolved in a predictable time period when a difference between inputs of the comparator is greater than a first threshold difference or in an unpredictable time period when the difference is less than a second threshold. The first and second threshold may depend on physical device properties of a comparator device specification, for instance. Thus, in this example, the example design analyzer 202 could identify the comparator as a conditional trigger for injecting metastability logic dynamically during a simulation.

As a second example, if a clock input of a register in the circuit design is routed to a selectable clock path (e.g., multiplexer that routs one of two different clocks into a clock input of the register, etc.), then the example design analyzer 202 could identify clock selection circuitry (e.g., multiplexer) that controls the selectable clock path as a conditional trigger for injecting metastability logic dynamically during a simulation.

As a third example, the example design analyzer 202 determines that a source domain portion of a circuit (controlled by a first clock or reset) provides multiple domain crossing signals to a destination domain (controlled by a second clock or reset). In this example, the example design analyzer 202 notifies the example reporter of 114 of FIG. 1 to use a different timing violation threshold (e.g., setup window, hold window) than when the source domain portion only provides a single domain crossing signal to the destination domain. In this way, for instance, the example reporter 114 can more accurately detect non-correlated timing violations for convergence design verification associated with the multiple domain crossing signals.

In the illustrated example of FIG. 2, the example design analyzer 202 includes an example clock analyzer 204 and an example reset analyzer 206.

The example clock analyzer 204 analyzes and/or identifies various clock paths connected (based on a description of the circuit design) to clock inputs of one or more digital components in the circuit design. By way of example, the example clock analyzer 204 searches a gate level and/or HDL description of the circuit design to identify the selectable clock path described above. In another example, the example clock analyzer 204 searches the description of the circuit design to identify dynamically changing clock signals (e.g., clock signals having a dynamically changing frequency and/or phase).

The example reset analyzer 206 similarly analyzes and/or identifies various reset paths connected (based on a description of the circuit design) to reset inputs of one or more digital components in the circuit design.

The example domain determiner 208 identifies a first portion of the circuit design as a source domain and/or a second portion of the circuit design as a destination domain. The example domain determiner 208 determines the source and destination domains based on the description of the circuit design indicating that an input of the destination domain receives a domain crossing signal (directly or indirectly) from an output in the source domain. In some examples, the determination by the example domain determiner 218 is additionally or alternatively based on the source domain and the destination domain being clocked by different (e.g., asynchronous) clocks. In some examples, the determination by the example domain determiner 218 is additionally or alternatively based on the source domain and the destination domain being controlled by different (e.g., asynchronous) reset signals.

The example metastability injector 210 dynamically adjusts a simulation model of the circuit design to simulate an impact of metastability (e.g., unpredictable cyclic delay of a digital signal, etc.) during a simulation. In some examples, the example metastability injector 210 injects metastability logic (e.g., synchronizer logic, etc.) to mimic pseudo-random delay of an output digital signal from a circuit component that receives an asynchronous input signal. Additionally or alternatively, in some examples, the example metastability injector 210 adjusts an error detection threshold (e.g., timing violation detection window) used by the example reporter 114 of FIG. 1 to detect timing violations (e.g., setup/hold time violations) associated with an input of a digital component that is clocked by a clock.

The example metastability controller 212 monitors the example simulation data 118 during a simulation of the circuit design, and conditionally triggers injection of metastability logic into a simulation model of the circuit design in response to detection of a metastability condition (e.g., timing violation, clock path selection, design behavior affecting signal timing uncertainty at an input of a destination domain, etc.) during the simulation. Thus, in some examples, the metastability controller 212 dynamically enables and/or disables injection of metastability logic by the metastability injector 210 during a simulation of a circuit design.

Figure 3:
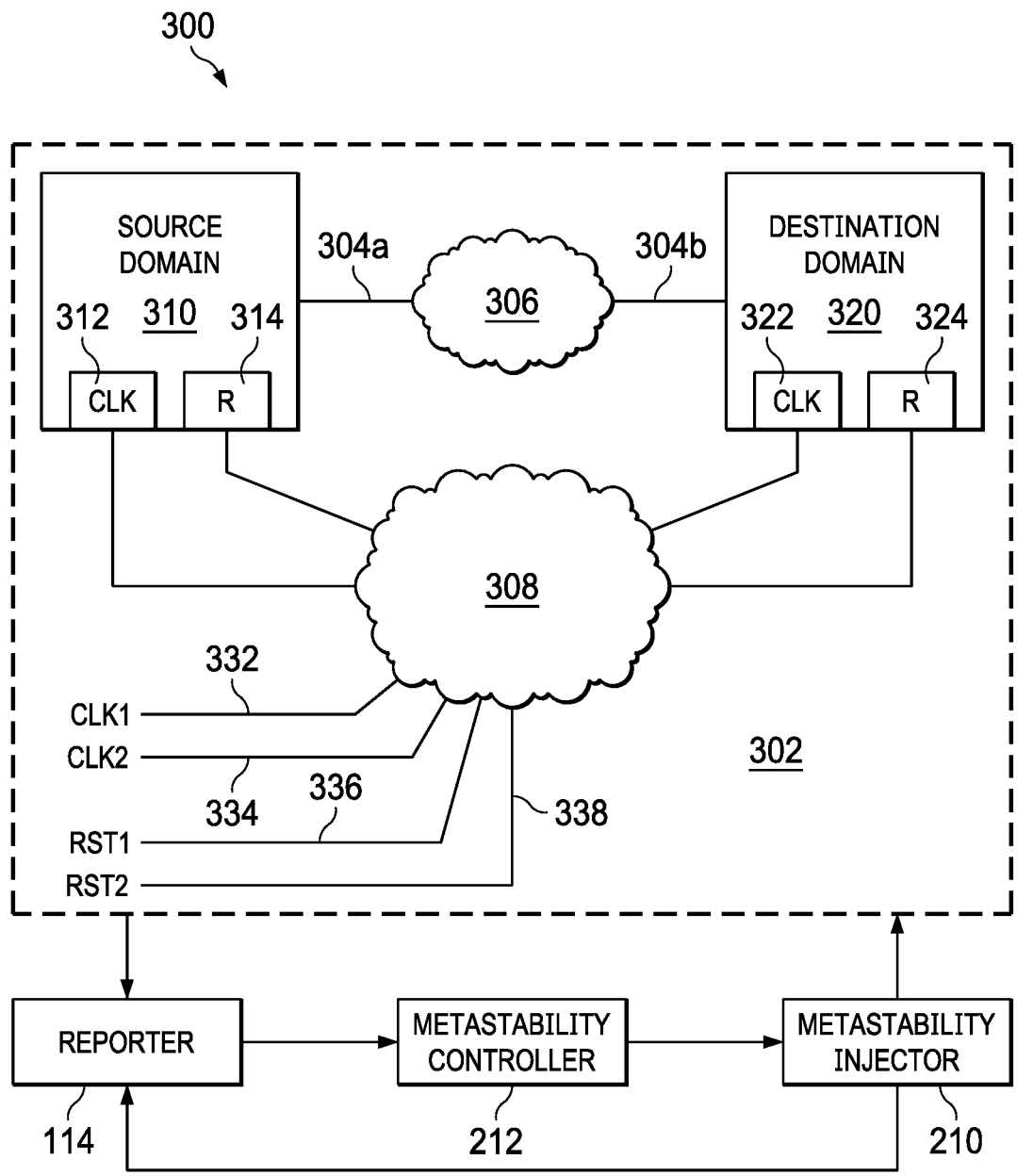
FIG. 3 is a block diagram of an example system for simulating operation of an example circuit, in accordance with teachings in this disclosure.

FIG. 3 is a block diagram of an example system 300 for simulating operation of an example circuit 302, in accordance with teachings in this disclosure. For example, the example system 300 in the illustrated example of FIG. 3 represents a simulation process performed by the example design verifier 102 of FIG. 1.

The example circuit 302 of the example system 300 includes a simulation model generated by the example circuit modeler 110 of FIG. 1 for a circuit design indicated by the example circuit design data 106 of FIG. 1. For example, the circuit 302 may implement a circuit design, a simulation model of a circuit design, a simulation model of a circuit, etc. In some examples, the simulation model of the circuit 302 represented by the blocks and connections illustrated in FIG. 3 is based on a gate level description (e.g., RTL description) generated by the example circuit modeler 110. In the illustrated example of FIG. 3, the example circuit 302 includes example signals 304a, 304b, example interface circuitry 306 and 308, an example source domain 310, and an example destination domain 320.

The example signal 304a is a data signal transmitted from the example source domain 310 to the example interface circuitry 306. The example signal 304b is a data signal transmitted from the example interface circuitry 306 to the example destination domain 320.

In some examples, the example interface circuitry 306 and 308, the example source domain 310, and the example destination domain 320 correspond to portions of the example circuit 302 that are determined by the example domain determiner 208 of FIG. 2 based on the gate level description of the example circuit 302.

The example interface circuitry 306 and 308 include circuitry and/or connections (e.g., described by the circuit design data 106) along input signal paths connected to inputs (e.g., data inputs, clock inputs, reset inputs) of the example source domain 310 and/or the example destination domain 320. In the illustrated example of FIG. 3, the example interface circuitry 306 receives signal 304a from the example source domain 310 and outputs signal 304b to the example destination domain 320. Further, in the illustrated example of FIG. 3, the example interface circuitry 308 receives example control signals 332, 334, 336, 338, and provides input signals connect to clock inputs 312, 322 and reset inputs 314, 324.

In some examples, the example interface circuitry 306 and/or 308 include combinatorial logic that manipulates signals input thereto asynchronously (e.g., without waiting for a clock edge). Thus, the timing of outputs of the interface circuitry 306 and/or 308 are not necessarily synchronized by any particular clock in the example circuit 302.

The example source domain 310 corresponds to a portion of the example circuit 302 that includes one or more digital components clocked according to a first clock input 312 and/or reset according to a first reset input 314. In a first example, the example source domain 310 includes one or more registers (e.g., flip-flops, etc.) having respective clock inputs connected to a same input clock signal. Alternatively or additionally, the example source domain 310 includes one or more registers (e.g., flip-flops) having respective reset inputs connected to a same reset control signal.

The example destination domain 320 corresponds to another portion of the example circuit 302 that includes one or more digital components clocked according to a second clock input 322 and/or reset according to a second reset input 324.

In the illustrated example of FIG. 3, the signal 304a output from the example source domain 310 is transmitted through interface circuitry 306 and received at an input of the example destination domain 320 as data signal 304b. If clock inputs 312 and 322 are connected to different clocks, then the data signal 304b corresponds to a clock domain crossing (CDC) signal that is asynchronous with respect to the clock input 322 of the example destination domain 320. If reset inputs 314 and 324 are connected to different reset control signals, then the data signal 304b corresponds to a reset domain crossing (RDC) signal.

In some examples, the example control signals 332 and 334 correspond to clock signals (e.g., 'CLK1' and 'CLK2') generated by a respective clock sources (e.g., clock crystals, etc.) when the example circuit 302 is physically implemented. In some examples, during a simulation, the example control signals 332 and 334 (e.g., 'CLK1' and 'CLK2') and the example reset control signals 336 and 338 (e.g., 'RST1' and 'RST2') are simulated by the example simulator 112 of FIG. 1 based on digital signal patterns indicated in the example testbench data 104 of FIG. 1. Alternatively or additionally, in some examples, one or more of the example control signals 332, 334, 336, 338 are simulated based on a simulated operation of one or more circuit components (not shown) of the example interface circuitry 308.

In the illustrated example of FIG. 3, the example reporter 114 monitors, during a simulation of the example circuit 302, simulated signals at various nodes of the example circuit 302. In some examples, the monitored nodes include input and/or output nodes of the example source domain 310, such as the clock input 312, the reset input 314, and/or a data output (not shown) that outputs the signal 304a. In some examples, the monitored nodes additionally or alternatively include input and/or output nodes of the example interface circuitry 306, 308, and/or the example destination domain 320. In some examples, the monitored nodes additionally or alternatively include input and/or output nodes of subcomponents (e.g., individual circuit components) inside one or more of the example interface circuitry 306, 308, the example source domain 310, and/or the example destination domain 320.

In the illustrated example of FIG. 3, the metastability controller 212 analyzes the simulated signals monitored by the example reporter 114 and triggers injection of metastability logic by the example metastability injector 210.

In some examples, the example metastability injector 210 (when triggered) inserts the metastability logic into the simulation model of the example circuit 302. For example, the example metastability injector 210 may modify the simulation model of the example circuit 302 illustrated in FIG. 3 by adding synchronizer logic between the signal 304b and the destination domain 320 to simulate a pseudo-random delay in the timing of the signal 304b.

In some examples, the example metastability injector (when triggered) injects the metastability logic by adjusting an operation of the example reporter 114. For example, the example metastability injector 210 (when triggered) modifies a timing violation threshold used by the example reporter 114 to detect setup and/or hold timing violations of the signal 304b with respect to clock input 322. In this example, the example metastability injector 210 may modify the timing violation threshold in response to detection of multiple domain crossing signals between the example source domain 310 and the example destination domain 320.

In some examples, the example circuit 302 includes fewer or more components than those shown in the illustrated example of FIG. 3. To that end, in some examples, one or more of the blocks illustrated for the example circuit 302 may be combined or removed depending on the description of the circuit design indicated by the example circuit design data 106. Alternatively, one or more additional blocks or circuit connections can be added.

Figure 4:
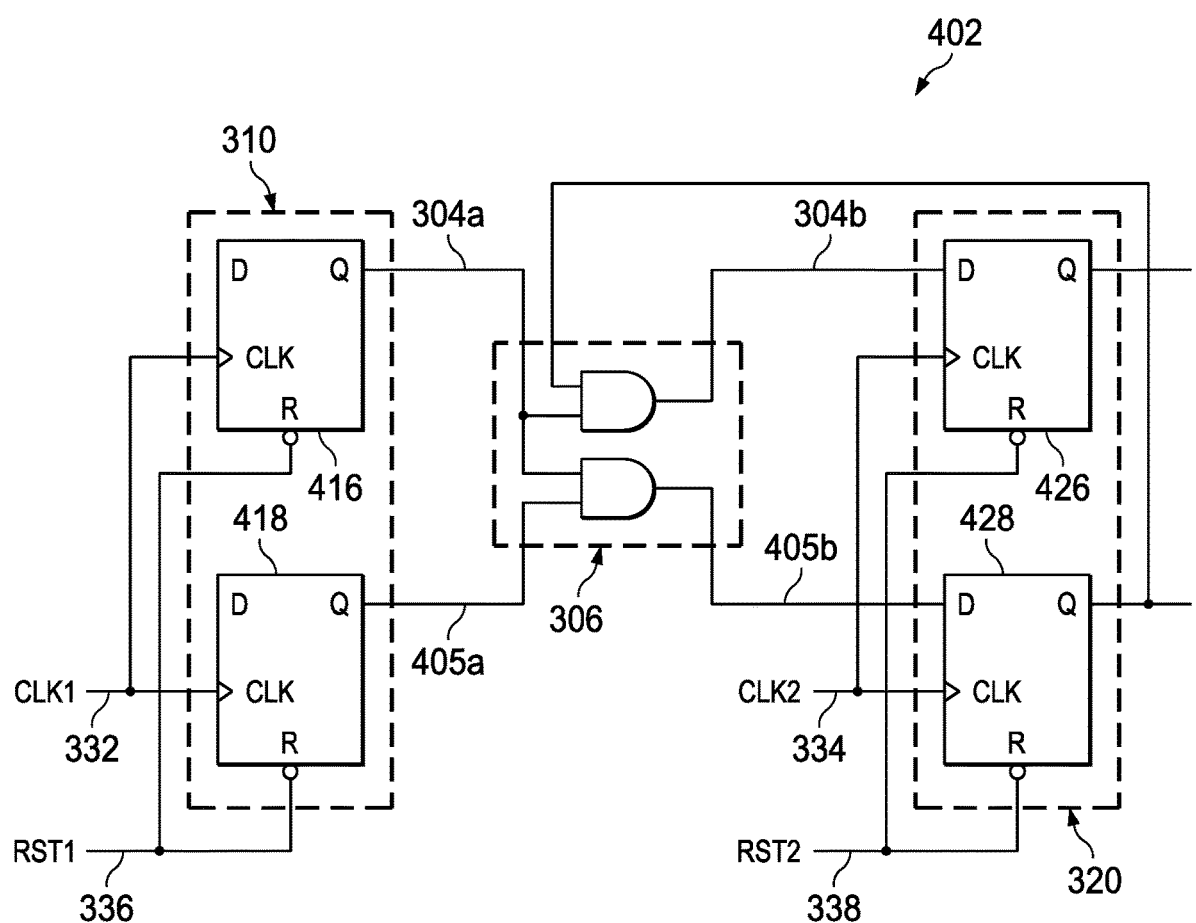
FIG. 4 is a schematic illustration of an example implementation of the example circuit of FIG. 3.

FIG. 4 is a schematic illustration of an example circuit 402, which may be an example implementation of the example circuit 302 of FIG. 3. In the illustrated example of FIG. 4, the example circuit 402 includes the example source domain 310, the example domain crossing signal 304a, 304b, the example interface circuitry 306, the example destination domain 320, the example control signals 332, 334, and the example reset signals 336, 338. Thus, in some examples, the example circuit 402 of FIG. 4 corresponds to an example simulation model (generated by the example circuit modeler 110) representing interconnected circuitry of an example circuit design described in the example circuit design data 106.

In the illustrated example of FIG. 4, the example source domain 310 includes example registers 416 and 418, and the example destination domain 320 includes example registers 426 and 428.

The example registers 416, 418, 426, 428 include data registers, flip-flops, memory storage elements, and/or any other clocked circuit component that updates its output in response to detecting a clock edge at its respective clock input.

In the illustrated example of FIG. 4, a first portion of the example circuit 402 including the registers 416 and 418 is connected (at respective clock inputs) to a same control signal 332 ('CLK1') and (at respective reset inputs) to a same reset signal 336 ('RST1'). As such, in this example, the example domain determiner 208 of FIG. 2 identifies the first portion of the example circuit 402 as the example source domain 310 that provides the example domain crossing signals 304a and 405a. Similarly, in this example, the example domain determiner 208 identifies a second portion of the example circuit 402 including the registers 426 and 428 as the example destination domain 320 based on both of the registers 426 and 428 being clocked by a same control signal 334 ('CLK2') and/or reset by a same reset signal 338 ('RST2').

Figure 5:
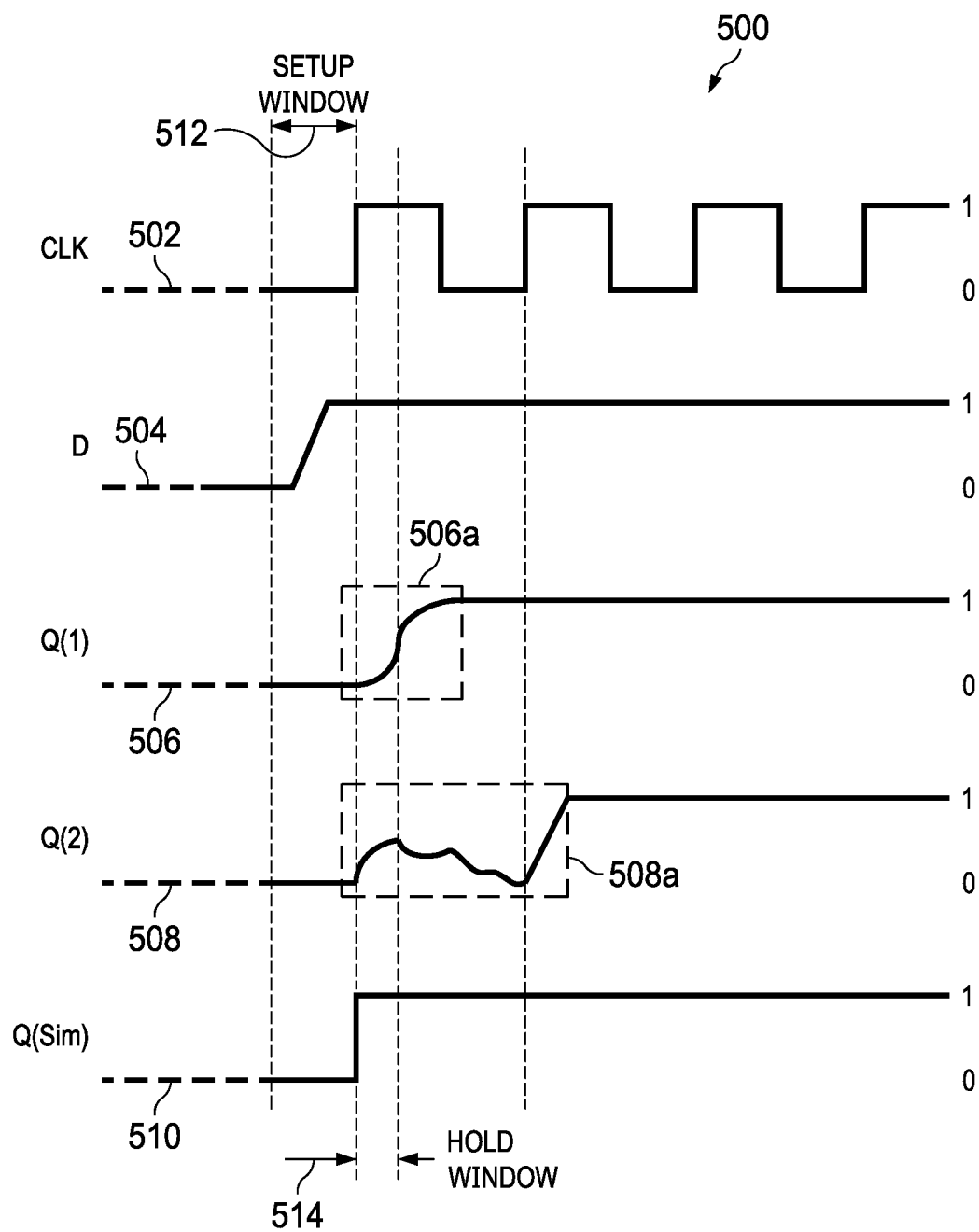
FIG. 5 is a timing diagram illustrating example outputs of an example clocked circuit component operated in a metastable state.

FIG. 5 is a timing diagram 500 illustrating example outputs of a clocked circuit component (e.g., register, flip-flop, etc.) operated in a metastable state. In the illustrated example of FIG. 5, the timing diagram 500 includes an example clock input signal 502('CLK'), an example data input signal 512 ('D'), a first example output signal 506 ('Q(1)'), a second example output signal 508 ('Q(2)'), and a third example output signal 510 ('Q(Sim)'

For the sake of example, the example input signals 502 and 504 ('CLK' and 'D') in the timing diagram 500 may correspond, respectively, to the 'CLK' and 'D' inputs of the example register 426 of FIG. 4.

Thus, in the illustrated example of FIG. 5, the example clock input signal 502 clocks the example register 426 such that the example register 426 updates its 'Q' output to match its 'D' input when a positive-clock-edge (e.g., clock logical state transitions from a value of '0' to a value of '1') is detected at the 'CLK' input of the example register 426.

In some scenarios, when a data register is implemented as a physical component, the register resolves a logical state of its output ('Q') in a predictable manner (e.g., in a predictable amount of time) if the signal ('D') remained constant during a setup window 512 prior to the active clock edge and during a hold window 514 after the active clock edge. However, due to physical device properties of the data register, if the input signal ('D') transitions to a different logical state during the setup window and/or the hold window, the logical state of the output ('Q') of the register is not resolved in a predictable manner (e.g., the output may settle at the expected logical state after a longer unpredictable amount of time).

For instance, in the illustrated example of FIG. 5, the example input signal 504 is shown to transition from a logical state of '0' to a logical state of '1' during a setup window 512. As a result, the clocked circuit component of FIG. 5 enters a metastable state and its output behaves unpredictably, such as any of the example possible unpredictable transitions 506a and 508a shown in FIG. 5 for the example possible output signals 506 and 508 ('Q(1)' and 'Q(2)'). More generally, when operating in the metastable state, the output of the clocked circuit component (e.g., the output 'Q' of the register 426) may settle to a logical state of '1' during the current clock cycle of the active clock edge or after one or more clock cycles.

Traditionally, circuit design verification systems do not account for such uncertainty in the timing of the output of a metastable circuit component. In the illustrated example of FIG. 5, for instance, the third example output signal 510 ('Q(Sim)') corresponds to an example simulated output of the clocked circuit component, which is simulated as transitioning to the logical state of '1' at the active clock edge (e.g., without accounting for output timing uncertainty associated with a physical device operating in a metastable state).

Accordingly, some examples disclosed herein include injecting metastability logic to account for such random cyclic delay to the logical transition of the third example output signal 510 ('Q(Sim)') when a potential metastability condition is detected during a simulation.

Figure 6A:
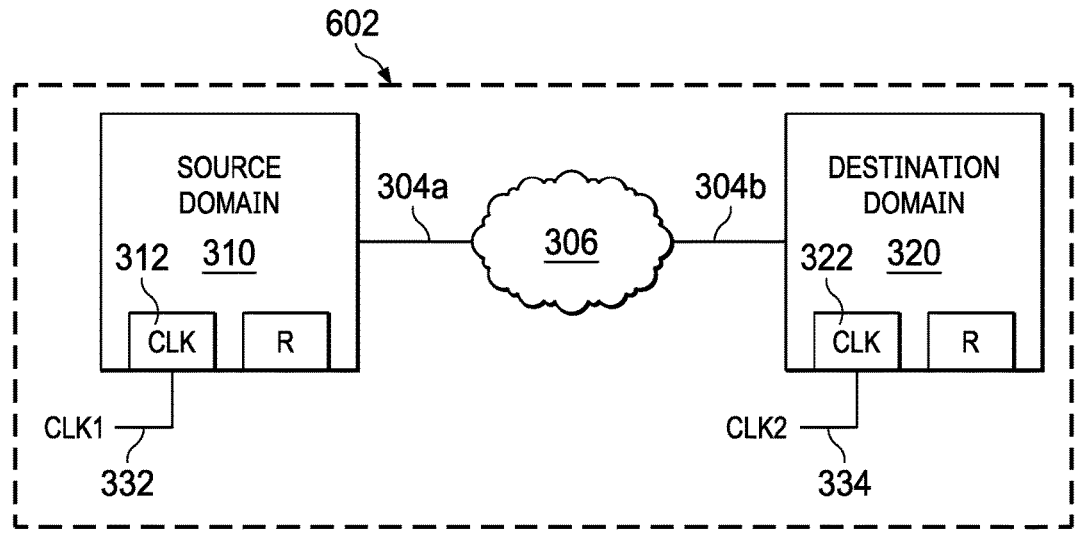
FIG. 6A illustrates an example implementation of the example circuit of FIG. 3 that includes a clock domain crossing (CDC) signal.

FIG. 6A illustrates an example circuit 602, which may be an example implementation of the example circuit 302 of FIG. 3 that includes a clock domain crossing signal 304b. For example, the example circuit 602 of the illustrated example of FIG. 6A corresponds to a simulation model generated by the example circuit modeler 110 for a circuit design described in the circuit design data 106. In the illustrated example of FIG. 6A, the clock inputs 312 and 322 of, respectively, the example source domain 310 and the example destination domain 320 are clocked by different control signals 332 and 334. Due to asynchronicity of the domain crossing signal 304b (e.g., CDC signal) with respect to the control signal 334 of the destination domain 320, the CDC signal 304b may trigger a metastable state of a register in the destination domain 320 if the logical state of the CDC signal 304b transitions during a setup window (e.g., setup window 512) or a hold window (e.g., hold window 514).

Accordingly, in some examples, the example metastability injector 210 of FIG. 2 conditionally injects metastability logic into the example circuit 602 during a simulation to model timing uncertainty associated with the metastable state of the register in the destination domain 320.

Figure 6B:
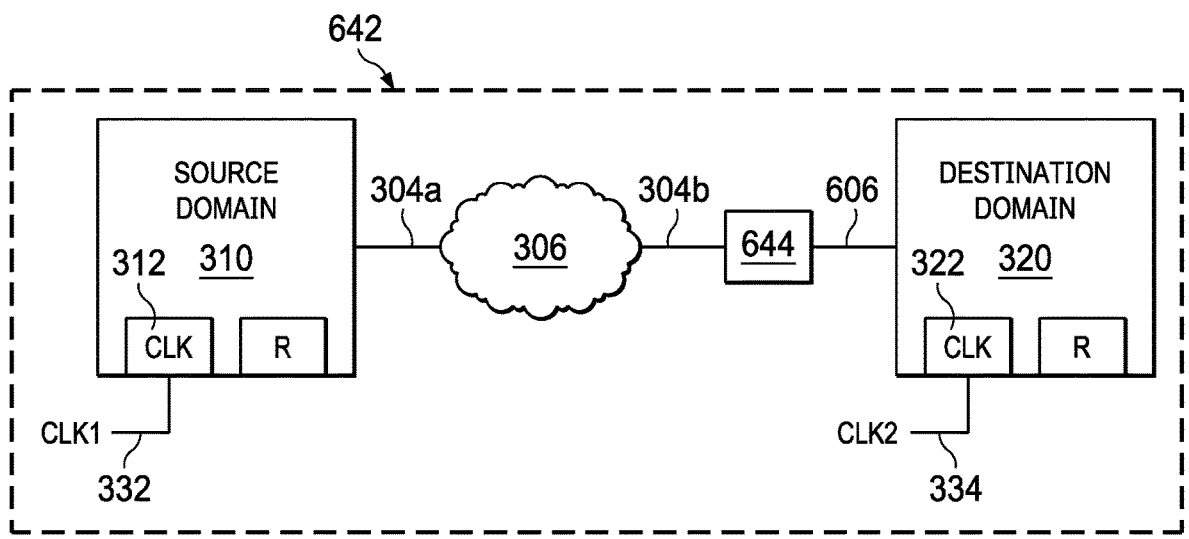
FIG. 6B illustrates an example modified circuit that is generated using the example metastability generator of FIGS. 1 and 2 during a simulation to model metastability effects associated with the CDC signal of FIG. 6A.

FIG. 6B illustrates an example modified circuit 642 that is generated using the example metastability generator 116 of FIGS. 1 and 2 during a simulation to model metastability effects associated with the clock domain crossing signal 304b of FIG. 6A. In the illustrated example of FIG. 6B, a modified simulation model of the circuit 602 is represented as the example modified circuit 642. Specifically, in the illustrated example of FIG. 6B, an example injected metastability logic 644 is inserted at an input of the example destination domain 320 to receive the CDC signal 304b and output a signal 606 into the input of the destination domain 320 (instead of the CDC signal 304b).

In some examples, the signal 606 is an adjusted version of the CDC signal 304b that is output to the destination domain 320. For example, the signal 606 may correspond to a delayed version of the CDC signal 304b after passage of a pseudo-random delay (e.g., after zero 'CLK2' cycles, after one 'CLK2' cycle, or after two 'CLK2' cycles, etc.). To that end, in some examples, the injected metastability logic 644 is implemented as a digital synchronizer controlled by a pseudo-random control signal to introduce one or several possible time-delayed versions (and/or a non-delayed version) of the CDC signal 304*b* as the signal 606.

Figure 7A:
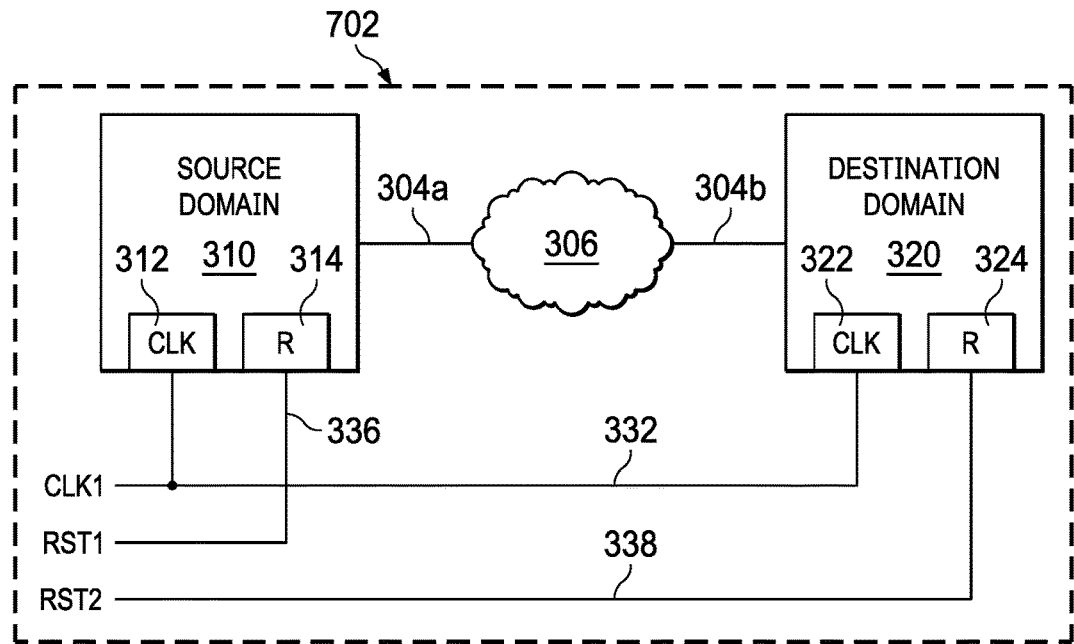
FIG. 7A illustrates an example implementation of the example circuit of FIG. 3 that includes a reset domain crossing (RDC) signal.

FIG. 7A illustrates an example implementation 702 of the example circuit 302 of FIG. 3 that includes a reset domain crossing (RDC) signal 704*b*. For example, the example circuit 702 of the illustrated example of FIG. 7A corresponds to a simulation model generated by the example circuit modeler 110 for a circuit design described in the circuit design data 106. In the illustrated example of FIG. 7A, both of the clock inputs 312 and 322 of, respectively, the example source domain 310 and the example destination domain 320 are clocked by a same control signal 332 ('CLK1'). Further, in the illustrated example of FIG. 7A, the reset inputs 314 and 324 of, respectively, the example source domain 310 and the example destination domain 320 are connected to different reset signals 336 and 338 ('RST1' and 'RST2'). Thus, in the illustrated example of FIG. 7A, the domain crossing signal 304*b* is an RDC signal 304*b*. Due to asynchronicity of the RDC signal 304*b* with respect to the control signal 332 connected to clock input 322 of the destination domain 320, the RDC signal 304*b* may trigger a metastable state of a register (not shown in FIG. 7A) in the destination domain 320 if the logical state of the RDC signal 304*b* is asserted or de-asserted during a setup window (e.g., setup window 512) or a hold window (e.g., hold window 514).

Accordingly, in some examples, the example metastability injector 210 of FIG. 2 conditionally injects metastability logic into the example circuit 702 during a simulation to model timing uncertainty associated with the metastable state of the register in the destination domain 320.

Figure 7B:
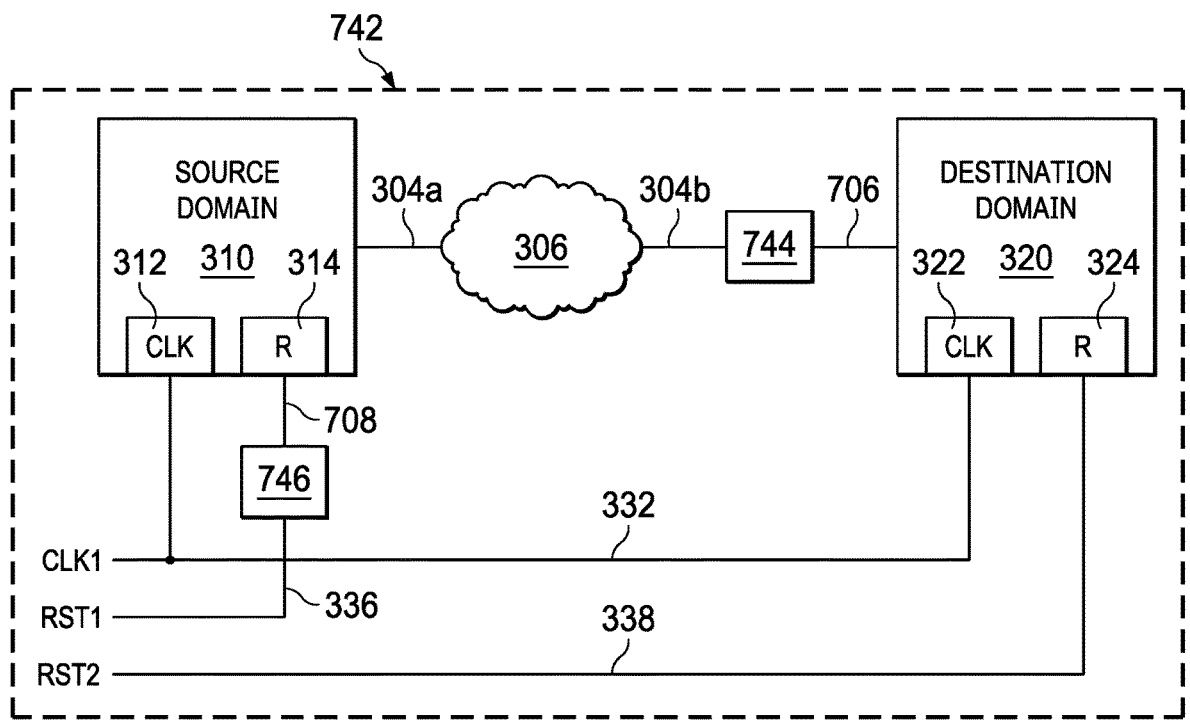
FIG. 7B illustrates an example modified circuit that is generated using the example metastability generator of FIGS. 1 and 2 during a simulation to model metastability effects associated with the RDC signal of FIG. 7A.

FIG. 7B illustrates an example modified circuit 742 that is generated using the example metastability generator 116 of FIGS. 1 and 2 during a simulation to model metastability effects associated with the RDC signal 704*b* of FIG. 7A. In the illustrated example of FIG. 7B, a modified simulation model of the circuit 702 is represented as the example modified circuit 742.

Specifically, in the illustrated example of FIG. 7B, an example injected metastability logic 744 is inserted (e.g., by the example metastability injector 210) at an input of the example destination domain 320 to receive the RDC signal 304*b* and output a signal 706 into the input of the destination domain 320 (instead of the CDC signal 304*b*). To that end, the example injected metastability logic 744 and the example signal 706 are implemented similarly to, respectively, the example injected metastability logic 644 and the example signal 606.

In some examples, the example metastability injector 210 inserts the injected metastability logic 744 into the simulation model when the reset signal 336 ('RST1') is de-asserted (e.g., logical state of RST1 changes from '1' to '0') during the simulation, and/or omits the injected metastability logic 744 from the simulation model when the reset signal 336 is asserted (e.g., logical state of RST1 changes from '0' to '1') during the simulation.

Further, in the illustrated example of FIG. 7B, an example injected metastability logic 746 is inserted (e.g., by the example metastability injector 210) at the reset input 314 of the example source domain 310 to receive the reset signal 336 and output a signal 708 into the reset input 314.

In some examples, the example metastability injector 210 inserts the injected metastability logic 746 into the simulation model when the reset signal 336 ('RST1') is asserted (e.g., logical state of RST1 changes from '0' to '1') during the simulation, and/or omits the injected metastability logic 746 from the simulation model when the reset signal 336 is de-asserted (e.g., logical state of RST1 changes from '1' to '0') during the simulation.

In some examples, the example injected metastability logic 746 includes a reset synchronizer that models, at the reset input 314, an on-cycle uncertainty in a timing of the reset signal 336 ('RST1').

Figure 8:
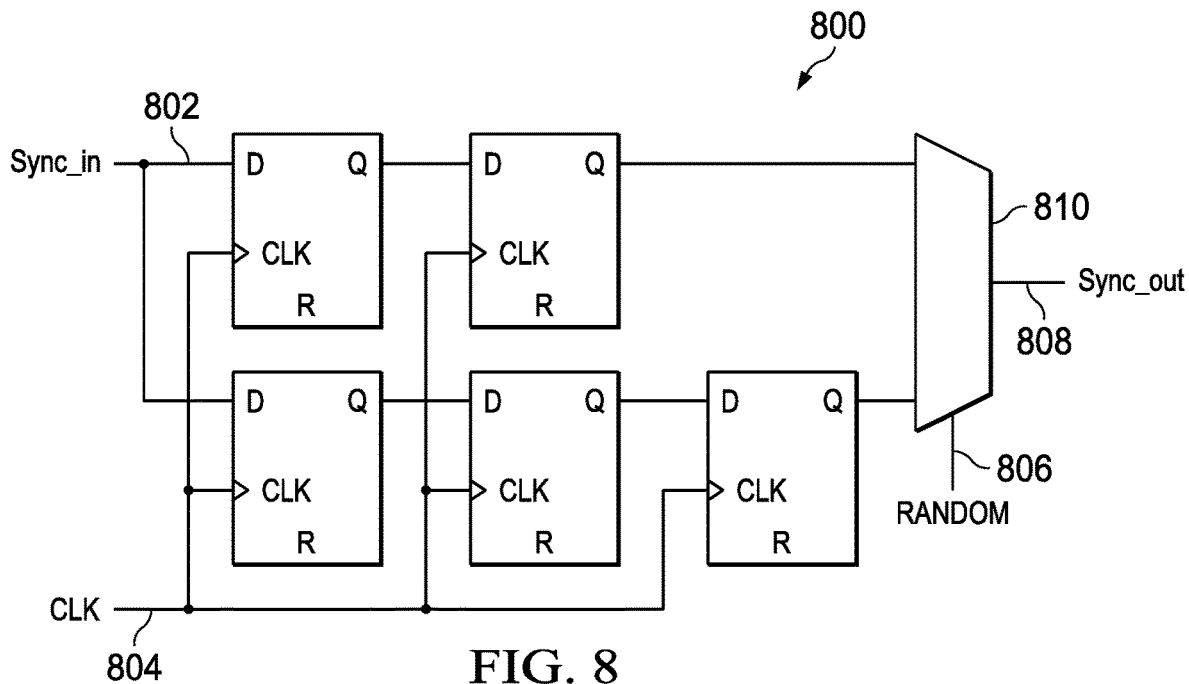
FIG. 8 is a schematic illustration an example synchronizer constructed in accordance with teachings in this disclosure as an example implementation of injected logic inserted by the example metastability injector of FIG. 2 during a simulation of a circuit design.

FIG. 8 is a schematic illustration an example synchronizer 800 constructed in accordance with teachings in this disclosure as an example implementation of injected metastability logic 644 of FIG. 6B (and/or injected metastability logic 744 of FIG. 7B) inserted by the example metastability injector 210 of FIG. 2 during a simulation of a circuit design. Referring back to FIG. 6B for example, an input of the synchronizer 800 may receive the CDC signal 304*b* and an output of the synchronizer 800 may provide the signal 606 as an output synchronized signal 808.

In the illustrated example of FIG. 8, the example synchronizer 800 is a two-stage synchronizer that models a pseudo-random delay randomly (or pseudo-randomly) selected from a 2-cycle delay path or 3-cycle delay path. For example, as shown in FIG. 8, the example synchronizer 800 includes a multiplexer 810 controlled by a pseudo-random selection signal 806. If the signal 806 corresponds to a first logical state, then the multiplexer 810 routes a delayed version of an input signal 802 (delayed by up to two clock cycles) as an output synchronized signal 808. Whereas, if the signal 806 corresponds to a second logical state, then the multiplexer 810 routes a different delayed version of the input signal 802 (delayed by up to three clock cycles) as the output synchronized signal 808.

In alternative examples, the example synchronizer 800 outputs the output synchronized signal 808 corresponding to a delayed version of an input signal 802 that is delayed according to a different number of clock cycles, and/or corresponding to a non-delayed version of the input signal 802.

Figure 9:
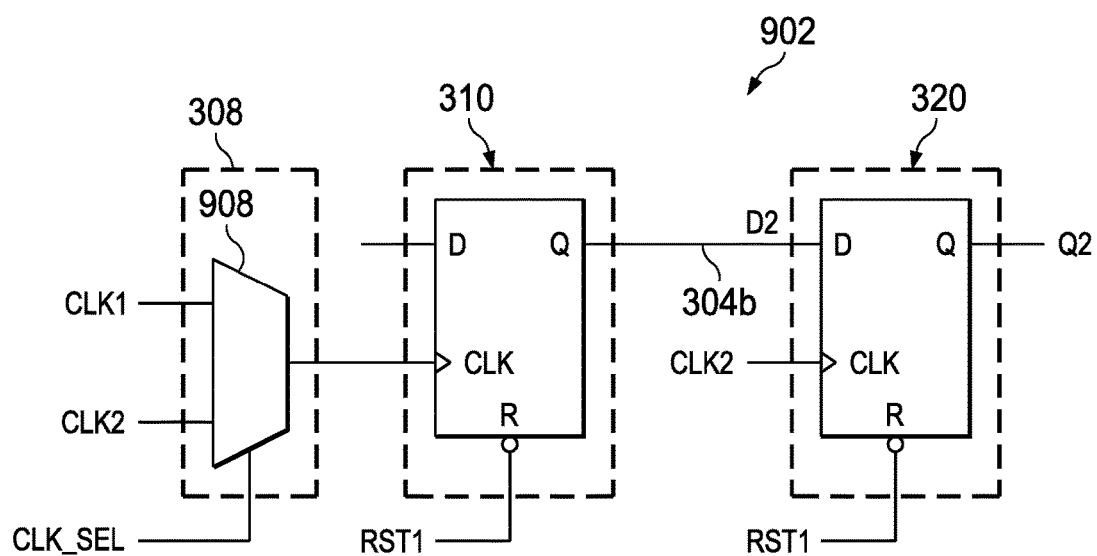
FIG. 9 is a schematic illustration of an example implementation of the example circuit of FIG. 3 including a selectable clock path.

FIG. 9 is a schematic illustration of an example circuit 902, which may be an example implementation of the example circuit 302 of FIG. 3 including a selectable clock path. In some examples, the example circuit 902 of the illustrated example of FIG. 9 corresponds to a simulation model generated by the example circuit modeler 110 for a circuit design described in the circuit design data 106. In the illustrated example of FIG. 9, the example interface circuitry 308 provides a selectable clock path as a clock input of the example source domain 310. For example, as shown in FIG. 9, the example interface circuitry 308 includes an example multiplexer 908. The example multiplexer 908 dynamically selects one of clock signals CLK1 or CLK2 as an input clock of the example source domain 310 depending on a current logical state of a clock selection input ('CLK_SEL') during operation and/or simulation of the example circuit 902. The logical state of the 'CLK_SEL' input could vary over time, and in turn, the source domain 310 may be clocked by different clocks depending on the current logical state of the 'CLK_SEL' input of the multiplexer 908.

For instance, in the illustrated example of FIG. 9, the signal 304*b* received at the example destination domain 320 sometimes corresponds to a synchronous signal if the multiplexer 908 routes a same clock signal (e.g., 'CLK2') to the source domain 310 as that of the destination domain 320. However, in some instances, the signal 304 sometimes corresponds to an asynchronous CDC signal if the multiplexer 908 routes a different clock signal (e.g., 'CLK1') than that of the destination domain 320.

Accordingly, in some examples, the example metastability injector 210 of FIG. 2 conditionally injects metastability logic into a simulation model of the example circuit 902 during a simulation based on a selected clock path in the example circuit 902. For instance, in the illustrated example of FIG. 9, if the multiplexer 908 selects 'CLK1' during a simulation, then the example metastability injector 210 inserts the metastability logic (e.g., injected metastability logic 644 of FIG. 6B) between the signal 304b and the destination domain 320 similarly to the insertion of the injected metastability logic 644 in the illustrated example of FIG. 6B. Whereas, if the multiplexer selects 'CLK2' during the simulation, then the example metastability injector 210 omits the inserted metastability logic from the simulation model of circuit 902.

Figure 10:
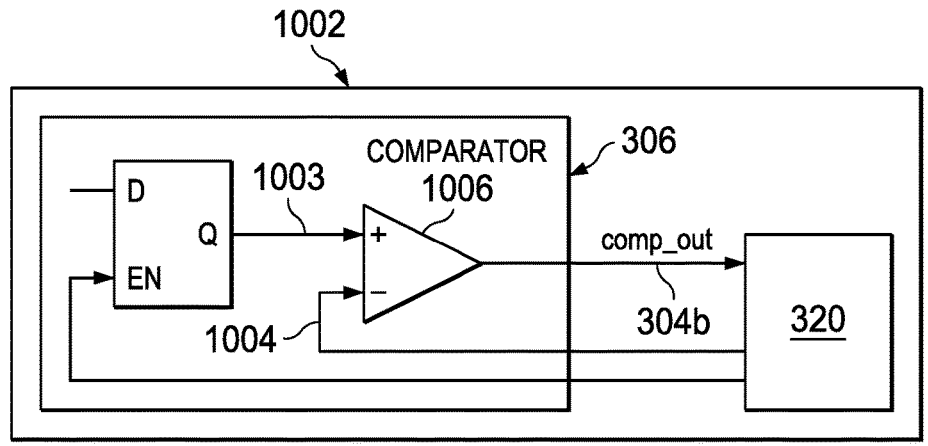
FIG. 10 is a schematic illustration of an example implementation of the example circuit of FIG. 3 that includes a comparator.

FIG. 10 is a schematic illustration of an example circuit 1002, which may be an example implementation of the example circuit 302 of FIG. 3 that includes an example comparator 1006. In some examples, the example circuit 1002 of the illustrated example of FIG. 10 corresponds to a simulation model generated by the example circuit modeler 110 for a circuit design described in the circuit design data 106. In the illustrated example of FIG. 10, the example interface circuitry 306 provide the signal 304b received at an input of the destination domain 320.

In the illustrated example of FIG. 10, the example interface circuitry 306 include one or more circuit elements, such as the example comparator 1006, along a signal path of the signal 304b ('comp_out') received at the input of the destination domain 320. The example comparator 1006 causes the signal 304b to have a first logical state (e.g., logical state of '1') when a voltage level of a first input signal at a first comparator input 1003 is greater than that of a second input signal at a second comparator input 1004. Alternatively or additionally, the example comparator 1006 causes the signal 304b to have a second logical state (e.g., logical state of '0') when the voltage level of the first input signal at the first comparator input 1003 is less than that of the second input signal at the second comparator input 1004.

In some examples, due to physical properties of a comparator device, the time required by a physically implemented comparator modeled by the example comparator 1006 to resolve the 'comp_out' output signal is predictable when a difference between the comparator inputs 1003 and 1004 is greater than a threshold difference, and is relatively less predictable when the difference between the comparator inputs 1003 and 1004 is less than the threshold difference. As such, when the comparator 1006 is operating in the less predictable state, the 'comp_out' signal 304b could arrive during a setup window (e.g., setup window 512) and/or a hold window (e.g., hold window 514) associated with a clock of the destination domain 320.

Accordingly, in some examples, the example metastability injector 210 of FIG. 2 conditionally injects metastability logic into a simulation model of the example circuit 902 during a simulation based on a design behavior of one or more circuit elements (e.g., the comparator 1006, etc.) along a signal path of an input of a destination register (e.g., in the destination domain 320). For instance, in the illustrated example of FIG. 10, if the example metastability controller 212 determines that a difference between the comparator inputs 1003 and 1004 (during the simulation) is less than a threshold difference, then the example metastability injector 210 inserts metastability logic (e.g., injected metastability logic 644 of FIG. 6B) between the signal 304b and the destination domain 320 similarly to the insertion of the injected metastability logic 644 in the illustrated example of FIG. 6B. Whereas, if the example metastability controller 212 determines that the difference between the comparator inputs 1003 and 1004 (during the simulation) is less than the threshold difference, then the example metastability injector 210 omits the inserted metastability logic from the simulation model of circuit 1002. Thus, in some examples, the example metastability controller 212 controls the injected metastability logic during the simulation based on a difference between simulated voltage levels at inputs (e.g., 1003 and 1004) of the comparator.

Figure 11A:
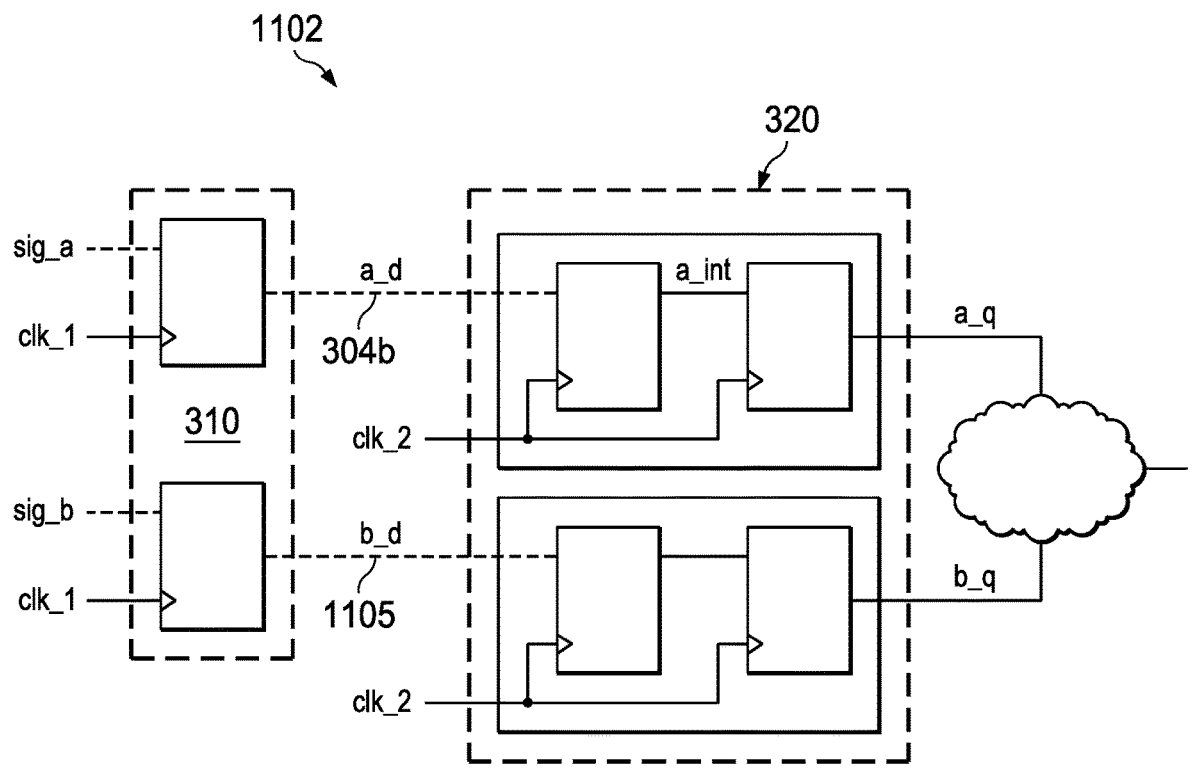
FIG. 11A is a schematic illustration of an example implementation of the example circuit of FIG. 3 including a plurality of domain crossing signals from a same source domain.

FIG. 11A is a schematic illustration of an example circuit 1102, which may be an example implementation of the example circuit 302 of FIG. 3 including a plurality of domain crossing signals 304b and 1105 crossing from a same source domain 310 into the destination domain 320. In some examples, the example circuit 1102 of the illustrated example of FIG. 11A corresponds to a simulation model generated by the example circuit modeler 110 for a circuit design described in the circuit design data 106. In the illustrated example of FIG. 11A, the example source domain 310 includes one or more circuit elements (e.g., flip-flops, etc.) clocked by a first clock (e.g., 'clk_1'), and the example destination domain 320 includes one or more circuit elements clocked by a second clock (e.g., 'clk_2). Thus, in the illustrated example of FIG. 11A, the domain crossing signals 304b d') and 1105 (1) d) are CDC signals because they cross from a first clock domain (e.g., the source domain 310) of the example circuit 1102 to a second clock domain (e.g., the destination domain 320) of the example circuit 1102.

Figure 11B:
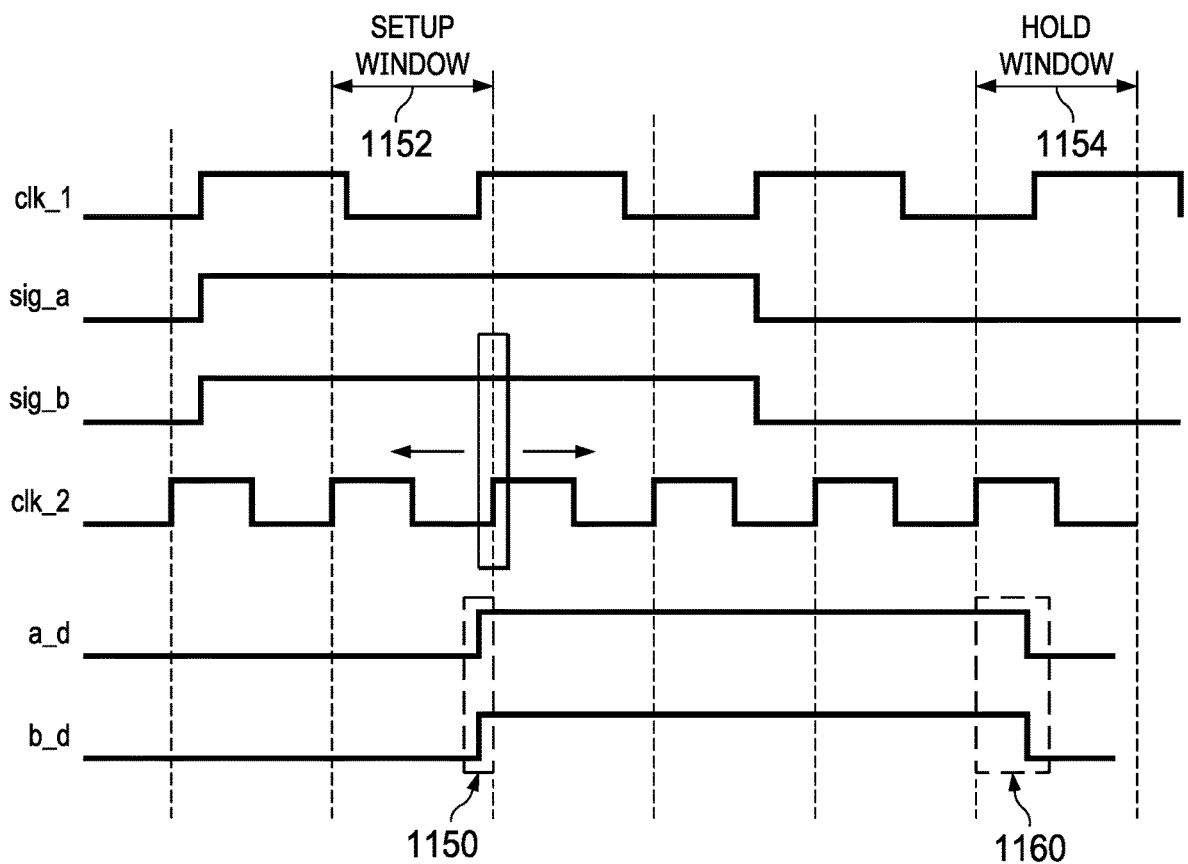
FIG. 11B is a timing diagram of example signals simulated in accordance with a first example implementation of the example circuit design of FIG. 11A.

FIG. 11B is a timing diagram of example signals simulated in accordance with a first example implementation of the example circuit 1102 of FIG. 11A. In the illustrated example of FIG. 11B, example state transitions 1150 indicate transition of the CDC signals 'a_d' and 'b_d' from a logical state of '0' to a logical state of '1', and example state transitions 1162 indicate transition of the CDC signals 'a_d' and 'b_d' from a logical state of '1' to a logical state of '0'.

Referring back to the illustrated example of FIG. 5, in some examples, the example reporter 114 outputs a timing violation message (e.g., setup violation, hold violation, etc.) if any of the transitions 1150 and/or 1160 occur during setup window 512 or held window 514 during a simulation of the example circuit 1102.

Returning now to FIG. 11B, in some examples, the example reporter 114 additionally or alternatively outputs the timing violation message if any of the transitions 1150 are detected in an adjusted setup window 1152 corresponding to a full clock cycle prior to an active clock edge of 'clk_2' during the simulation, and/or if any of the transitions 1160 are detected in an adjusted hold window 1154 corresponding to a full clock cycle after an active clock edge of 'clk_2' during the simulation. In this way, for example, adjusted timing violation thresholds (e.g., the adjusted setup window 1152 and the adjusted hold window 1154) facilitate notifying a user about non-correlated timing violations during convergence design verification, such as in a scenario when correlated signals 'a_d' and 'b_d' input to the destination domain become non-correlated at outputs of the destination domain 320 (e.g., outputs 'a_q and 'b_q') due to a metastable state of one or more registers inside the destination domain 320.

To facilitate this, in some examples, the example metastability injector 210 of FIG. 2 conditionally injects metastability logic into the simulation model of the example circuit 1102 by adjusting one or more timing violation thresholds (e.g., the setup windows 1152 and/or 1154) used to detect timing violation events associated with simulated signal transitions within the adjusted timing violation thresholds. In some examples, the metastability injector 210 injects and/or omits the metastability logic (e.g., adjusts the one or more timing violation thresholds) in response to the example design analyzer 202 of FIG. 2 determining a number of domain crossing signals (e.g., 304*b*, 1105) between the example source domain 310 and the example destination domain 320. If a single domain crossing signal is identified (e.g., the single domain crossing signal 304*b* in the illustrated example of FIG. 9), then a first timing violation threshold is selected (e.g., the setup window 512 and/or the hold window 514 of FIG. 5). Whereas, if multiple domain crossing signals are identified (e.g., the CDC signals 304*b* and 1105 in the illustrated example of FIG. 11A), then a second timing violation threshold is selected (e.g., the setup window 1152 and/or the hold window 1154).

In line with the discussion above, in some examples, the example domain determiner 208 of FIG. 2 determines a number of domain crossing signals output from the example source domain 310 and received at the example destination domain 320. Referring back to FIG. 11A by way of example, the example domain determiner 208 determines that two domain crossing signals 304*b* and 1105 cross from the example source domain 310 to the example destination domain 320. Whereas, as another example, referring back to FIG. 9, the example domain determiner 208 instead determines that only one domain crossing signal 304*b* crosses from the example source domain 310 to the example destination domain 320.

In these examples, the example metastability controller 212 may control injected metastability logic based on the determined number of domain crossing signals. Returning back to FIG. 3 by way of example, the example metastability controller 212 may cause the example metastability injector 210 to adjust a setup window (used by the example reporter to detect setup violations) to a first threshold (e.g., similar to the setup window 512 of FIG. 5) if the determined number of domain crossing signals is one domain crossing signals, or to a second threshold (e.g., similar to the setup window 1152 of FIG. 11B) if the determined number of domain crossing signals is more than one domain crossing signal.

Figure 11C:
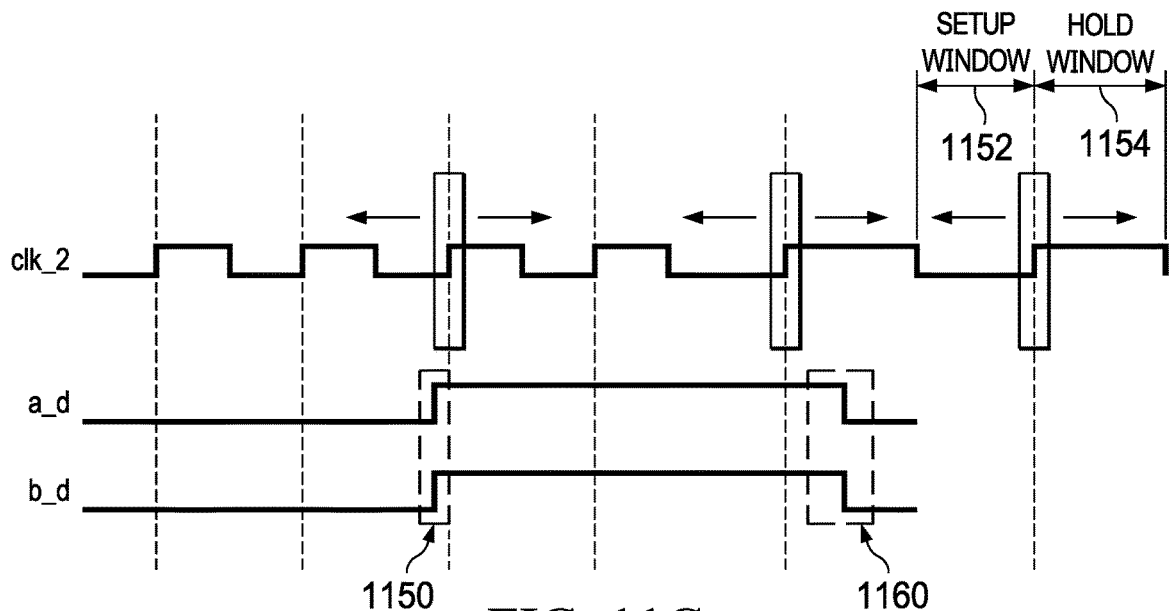
FIG. 11C is a timing diagram of example signals simulated in accordance with a second example implementation of the example circuit design of FIG. 11A.

FIG. 11C is a timing diagram of example signals simulated in accordance with a second example implementation of the example circuit 1102 of FIG. 11A. In the illustrated example of FIG. 11C, the clock 'clk_2' of the example destination domain 320 is a frequency-varying clock signal. In turn, the example metastability injector 210 of FIG. 2 dynamically adjusts the setup window 1152 and/or the hold window 1154 based on the frequency of the clock signal at the clock input of the example destination domain 320.

More generally, in some examples, the example metastability injector 210 dynamically adjusts one or more timing violation thresholds (e.g., used by the example reporter 114 to output timing violation messages) based on a simulated frequency of one or more clock signals in the example circuit 1102. For example, the simulated frequency may correspond to a frequency of a simulated clock signal (e.g., clock signal 'clk_2' of FIG. 11C) associated with the example destination domain 320. Alternatively or additionally, the simulated frequency may correspond to a different simulated clock signal (e.g., 'clk_1' of FIGS. 11A and 11B, etc.) associated with the example source domain.

Figure 11D:
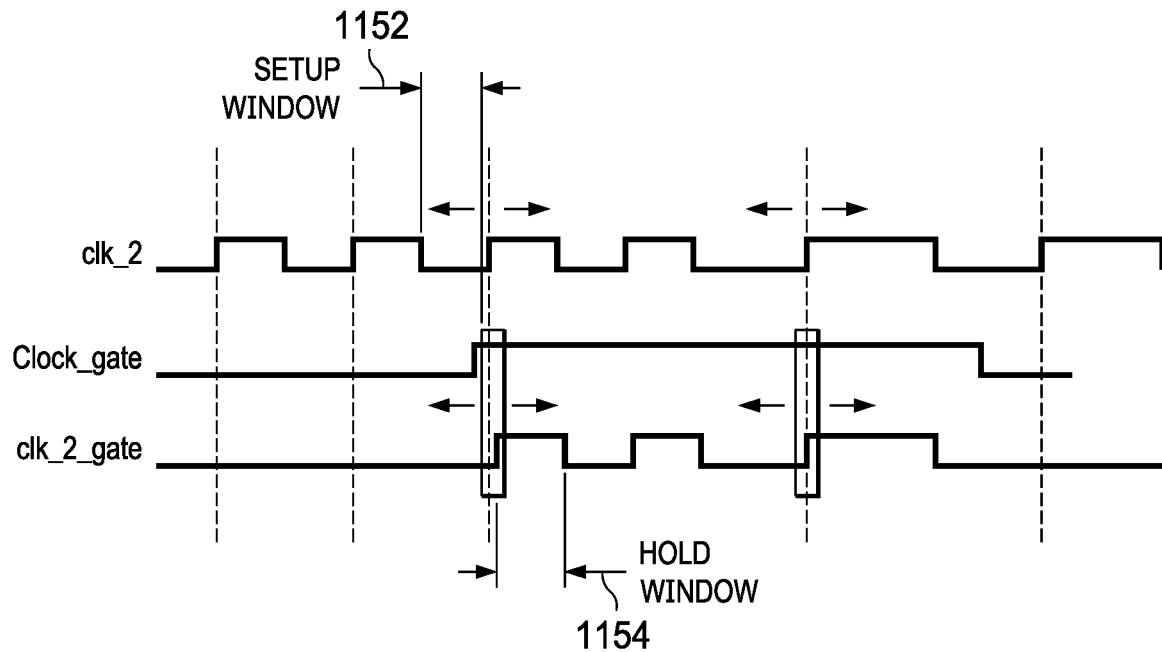
FIG. 11D is a timing diagram of example signals simulated in accordance with a third example implementation of the example circuit design of FIG. 11A.

FIG. 11D is a timing diagram of example signals simulated in accordance with a third example implementation of the example circuit design of FIG. 11A. In the illustrated example of FIG. 11D, the clock input of the example destination domain 320 is connected to a gated clock signal 'clk_2 gate' (e.g., similarly to the clock input of the source domain 310 in the illustrated example of FIG. 9). For example, the signal 'Clock gate' in the illustrated example of FIG. 11D may be similar to the 'CLK_SEL' selection signal in the illustrated example of FIG. 9. Further, in the illustrated example of FIG. 11D, clock ('clk_2') is a frequency varying clock signal.

Accordingly, in some examples, the example metastability injector 210 adjusts one or more timing violations thresholds (e.g., setup window 1152 and/or hold window 1154 in the illustrated example of FIG. 11D) based on an ungated version of a gated clock signal received at a clock input of the example destination domain 320.

Figure 12A:
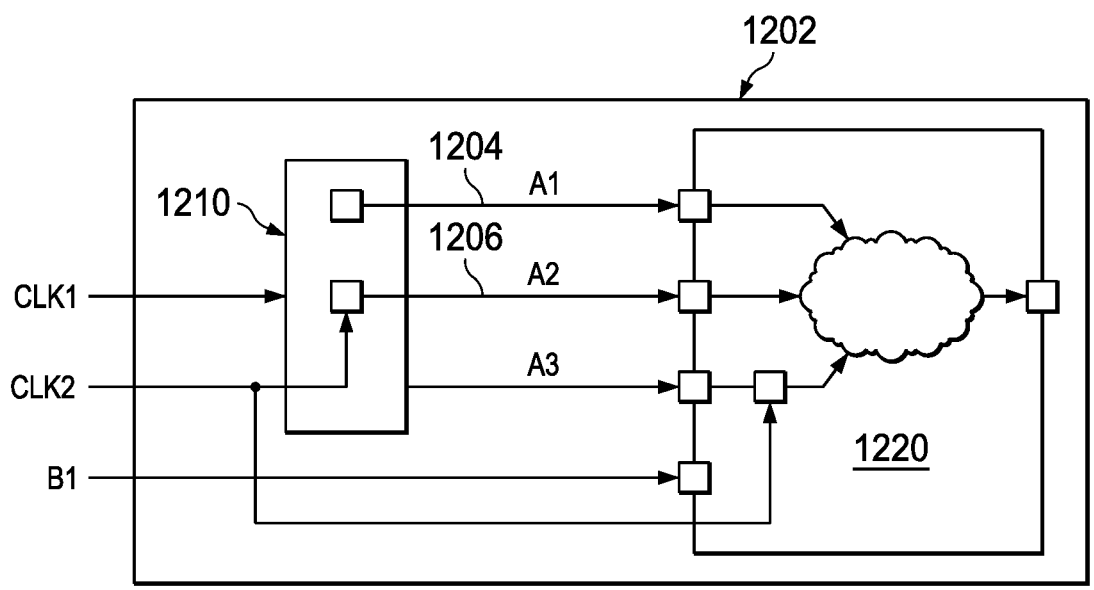
FIG. 12A is a schematic illustration of an example circuit design including an example Intellectual Property (IP) core.

FIG. 12A is a schematic illustration of an example circuit 1202 that includes one or more example IP cores 1210 and 1220. In some examples, the example circuit 1202 of the illustrated example of FIG. 12 corresponds to a simulation model generated by the example circuit modeler 110 for a circuit design described in the circuit design data 106.

Each of the example IP cores 1210 and 1220 of the example circuit 1202 include a combination of circuit elements (e.g., a unit of logic, etc.) that receive one or more inputs and provide one or more outputs. In some examples, the example domain determiner 208 identifies a first portion of the circuit 1202 as the example IP core 1210 and a second portion of the circuit 1202 as the example IP core 1220.

In the illustrated example of FIG. 12A, the example IP core 1220 receives signals 1204 and 1206 (from the example IP core 1210) that are potentially asynchronous with respect to a clock input (e.g., 'CLK2') of the example IP core 1220. In these examples, the example metastability injector 210 injects metastability logics at inputs of the example IP core 1220 to simulate a pseudo-random timing uncertainty (e.g., 0 clock cycle or 1 clock cycle, etc.) at inputs of the example IP core 1220.

Figure 12B:
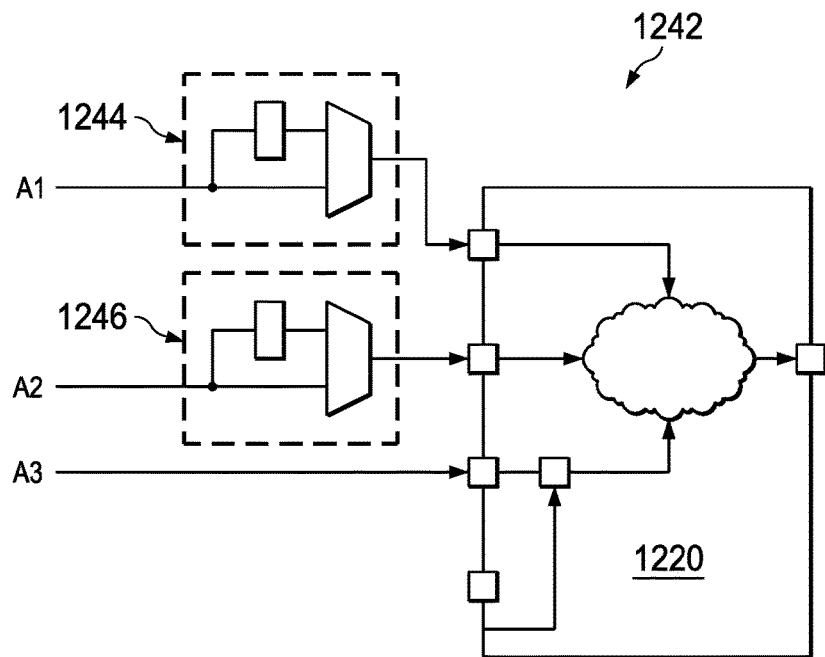
FIG. 12B is a partial schematic illustration of an example modified circuit design that is generated using the example metastability generator of FIGS. 1 and 2 to simulate metastability effects associated with the example IP core of FIG. 12A.

FIG. 12B is a partial schematic illustration of an example modified circuit design 1242 that is generated using the example metastability generator 116 of FIGS. 1 and 2 to simulate metastability effects associated with the example IP core 1220 of FIG. 12A. In the illustrated example of FIG. 12B, the example metastability injector 210 inserts example injected logic 1244 and 1246 into a simulation model of the circuit 1202 to generate the modified simulation model of the modified circuit design 1242. For example, the example injected logic 1224 and/or 1246 may be similar to the injected metastability logic 644 of the illustrated example of FIG. 6B. For instance, the example injected logic 1244 and/or 1246 may be incorporated into the simulation model by the example metastability injector 210 to simulate a one-clock-cycle uncertainty at one or more inputs (e.g., 'A1' and 'A2') of the example IP core 1220.

Figure 13:
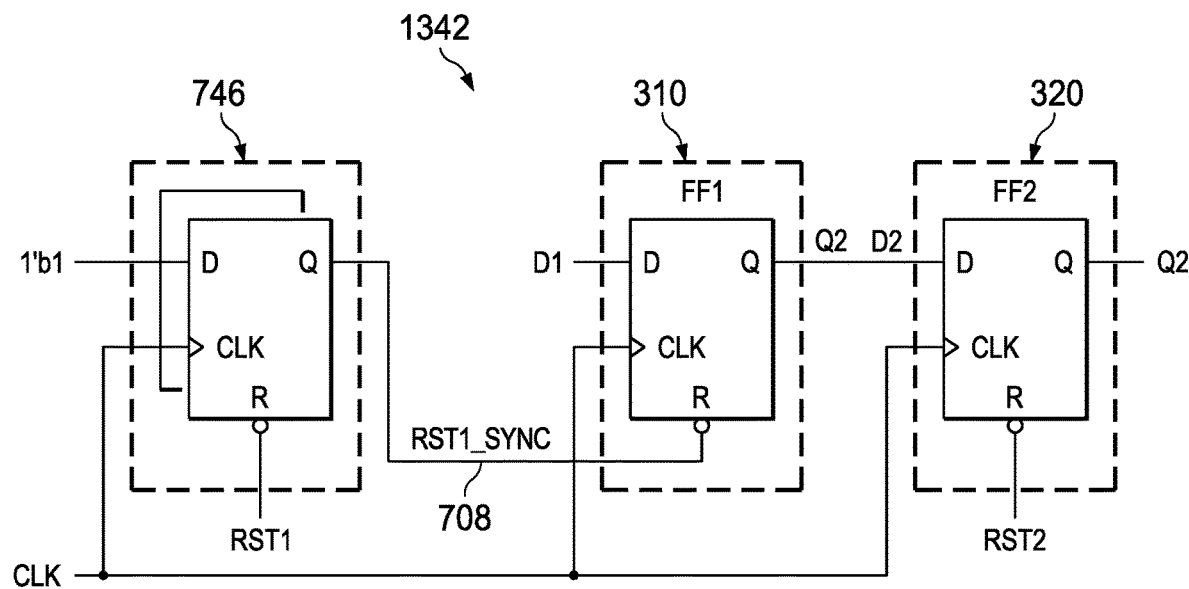
FIG. 13 is a schematic illustration of an example modified circuit design generated using the example metastability generator of FIGS. 1 and 2 to model metastability effects associated with a reset domain crossing signal.

FIG. 13 is a schematic illustration of an example implementation 1342 of the example modified circuit 742 of FIG. 7B. In the illustrated example of FIG. 13, the example injected metastability logic 746 includes a reset synchronizer to model a timing uncertainty in the signal 708, in line with the discussion in the description of FIG. 7B.

FIG. 14 is a partial schematic illustration of an example circuit 1402, which may be an example implementation of the example circuit 302 that includes an example latch 1410. Referring back to the illustrated example of FIG. 3 for instance, the example latch 1410 may be included in the interface circuitry 306 and/or 308.

In some examples, the example metastability injector 210 injects metastability logic at an output 1412 ('Q') of the example latch 1410 to simulate a pseudo-random logical state of '1' or '0' at the output 1412 when a reset input 1414 of the example latch 1410 is de-asserted (e.g., transitioned from a logical state of '1' or '0') during a simulation of circuit 1402, and/or omits the injected metastability logic from a simulation mode of the circuit 1402 when the reset input 1414 is asserted (e.g., transitioned from a logical state of '0' to '1').

In some examples, the example metastability injector 210 injects metastability logic (e.g., similar to injected logic 646 of FIG. 6B) at the output 1412 ('Q') to model timing uncertainty when a data input 1416 of the example latch 1410 is not synchronous to an enable input 1418 of the example latch 1410 during the simulation, and/or omits the injected metastability logic during the simulation when the data input 1416 is synchronous to the enable input 1418.

In some examples, the example metastability injector 210 injects metastability logic (e.g., similar to the injected logic 646 of FIG. 6B) at the output 1412 ('Q') to model timing uncertainty when the reset input 1414 of the example latch 1410 is not synchronously de-asserted with respect to the enable input 1418 during the simulation.

In some examples, the example metastability injector 210 injects metastability logic (e.g., similar to the injected logic 646 of FIG. 6B) at an input of a load of the latch 1410 (e.g., at the input of the destination domain 320 in the illustrated example of FIG. 6B) to model timing uncertainty when the reset input 1414 of the example latch 1410 is asserted, and/or omits the injected metastability logic when the reset input 1414 is de-asserted.

While an example manner of implementing the example design verifier 102 of FIG. 1 is illustrated in FIGS. 1 and 2, one or more of the elements, processes and/or devices illustrated in FIGS. 1 and 2 may be combined, divided, re-arranged, omitted, eliminated and/or implemented in any other way. Further, the example input handler 108, the example circuit modeler 110, the example simulator 112, the example reporter 114, the example metastability generator 116, the example design analyzer 202, the example clock analyzer 204, the example reset analyzer 206, the example domain determiner 208, the example metastability injector 210, the example metastability controller 212, and/or more generally, the example design verifier 102 of FIG. 1 may be implemented by hardware, software, firmware and/or any combination of hardware, software and/or firmware. Thus, for example, any of the example input handler 108, the example circuit modeler 110, the example simulator 112, the example reporter 114, the example metastability generator 116, the example design analyzer 202, the example clock analyzer 204, the example reset analyzer 206, the example domain determiner 208, the example metastability injector 210, the example metastability controller 212 and/or, more generally, the example design verifier 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input handler 108, the example circuit modeler 110, the example simulator 112, the example reporter 114, the example metastability generator 116, the example design analyzer 202, the example clock analyzer 204, the example reset analyzer 206, the example domain determiner 208, the example metastability injector 210, and/or the example metastability controller 212 is/are hereby expressly defined to include a non-transitory computer readable storage device or storage disk such as a memory, a digital versatile disk (DVD), a compact disk (CD), a Blu-ray disk, etc. including the software and/or firmware. Further still, the example design verifier 102 of FIG. 1 may include one or more elements, processes and/or devices in addition to, or instead of, those illustrated in FIGS. 1 and 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the example design verifier 102 of FIG. 1 is shown in FIG. 15. The machine readable instructions may be one or more executable programs or portion(s) of an executable program for execution by a computer processor and/or processor circuitry, such as the processor 1612 shown in the example processor platform 1600 discussed below in connection with FIG. 16. The program may be embodied in software stored on a non-transitory computer readable storage medium such as a CD-ROM, a floppy disk, a hard drive, a DVD, a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowchart illustrated in FIG. 15, many other methods of implementing the example design verifier 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example process of FIG. 15 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B.

Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a," "an," "first," "second," etc.) do not exclude a plurality. The term "a" or "an" entity, as used herein, refers to one or more of that entity. The terms "a" (or "an"), "one or more," and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 15 is a flowchart representative of machine readable instructions 1500 which may be executed to implement the example design verifier 102 of FIG. 1 and/or the example metastability generator 116 of FIG. 2.

At block 1502, the example circuit modeler 110 generates a simulation model for a circuit. Referring back to FIG. 3 for example, the simulation model may correspond to a representation of interconnected circuitry described in the circuit design data 106, such as the circuit 302 in the illustrated example of FIG. 3.

At block 1504, the example simulator 112 simulates operation of the circuit based on the generated simulation model. At block 1506, the example reporter 114 monitors simulated signals in the circuit.

At block 1508, the example metastability controller 212 determines whether a metastability condition is detected. The metastability condition, for example, may include detecting selection of a clock path in the circuit and/or detecting that a voltage difference between inputs of the example comparator 1006 is less than a threshold difference.

In some examples, at block 1508, the example design analyzer 202 identifies one or more circuit elements along a signal path of a signal received at an input of a register in the circuit. Referring back to FIG. 10 for example, the example design analyzer 202 identifies the example comparator 1006 as a circuit element along a signal path of signal 304*b* at an input of the destination domain 320. Further, referring back to FIG. 4 for example, the signal 304*b* may be at an input of register 426. In these examples, the example metastability controller 212 may control injected metastability logic (e.g., injected metastability logic 644 of FIG. 6B) based on a simulated state of the one or more circuit elements. Referring back to FIG. 10 for example, the simulated state of the comparator 1006 may correspond to simulated voltage levels of signals at the comparator inputs 1003 and 1004. If a difference between the simulated voltage levels is less than a difference threshold, then the example metastability controller 212 determines that a metastability condition is detected. Whereas, if the difference is greater than the difference threshold, the example metastability controller 212 determines that the metastability condition is not detected.

If the metastability condition is detected, then the machine readable instructions 1500 proceed to block 1510. Otherwise, the machine readable instructions 1500 proceed to block 1512.

At block 1510, the example metastability injector 210 injects metastability logic into the simulation model. In some examples, injecting the metastability logic includes inserting a synchronizer (e.g., the injected metastability logic 644) to simulate a pseudo-random cyclic delay. In some examples, injecting the metastability logic includes adjusting a timing violation threshold used to detect setup window and/or hold window timing violations.

At block 1512, the example metastability injector 210 omits the injected metastability logic from the simulation model if the metastability condition of block 1508 no longer exists.

At block 1514, the example simulator 112 continues the simulation. For example, the simulation of the circuit may include timing simulation(s) and/or other types of circuit operation simulation. In some examples, in response to injecting the metastability logic into the simulation model at block 1510, the simulator 112 may continue simulating the operation of the circuit based on the generated simulation model and the injection of the metastability logic into the simulation model. In some examples, in response to omitting the injected metastability logic from the simulation model at block 1512, the simulator 112 may continue simulating the operation of the circuit based on the generated simulation model and the omission of the injected metastability logic from the simulation model.

At block 1516, the example simulator 112 determines whether the simulation is completed (e.g., whether simulating the testbench data 104 is completed). If the simulation was completed, the machine readable instructions 1500 end. Otherwise, the machine readable instructions 1500 return to block 1506.

Figure 16:
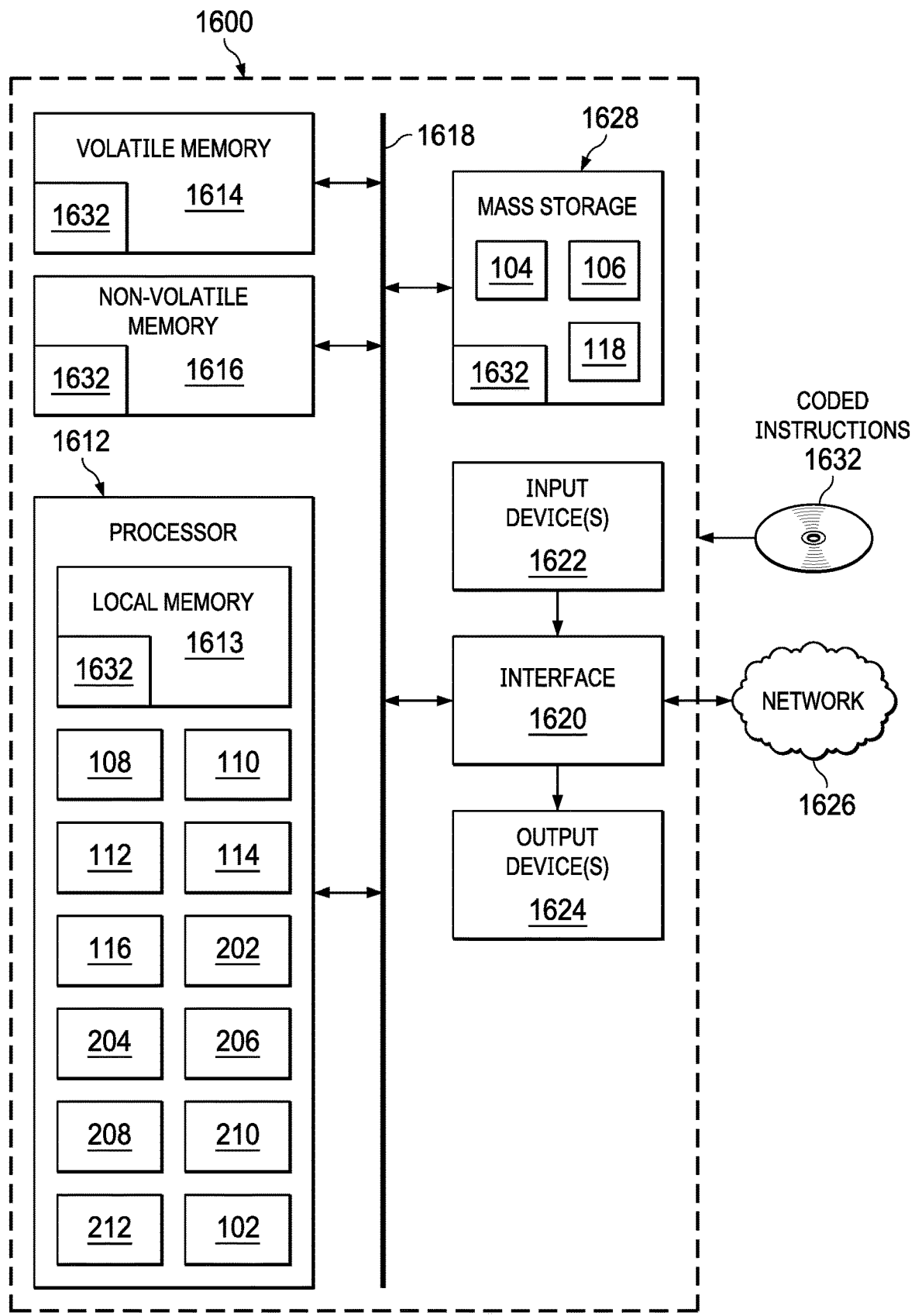
FIG. 16 is a block diagram of an example processing platform structured to execute the instructions of FIG. 3 to implement the example design verifier of FIG. 1 and/or the example metastability generator of FIG. 2.

FIG. 16 is a block diagram of an example processor platform 1600 structured to execute the instructions of FIG. 15 to implement the example design verifier 102 of FIG. 1 The processor platform 1600 can be, for example, a server, a personal computer, a workstation, a self-learning machine (e.g., a neural network), a mobile device (e.g., a cell phone, a smart phone, a tablet such as an iPad™, a personal digital assistant (PDA), an Internet appliance, a headset or other wearable device, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example design verifier 102, the example input handler 108, the example circuit modeler 110, the example simulator 112, the example reporter 114, the example metastability generator 116, the example design analyzer 202, the example clock analyzer 204, the example reset analyzer 206, the example domain determiner 208, the example metastability injector 210, and the example metastability controller 212.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and digital versatile disk (DVD) drives.

The machine executable instructions 1632 of FIG. 15 may be stored in the mass storage device 1628, in the volatile memory 1614, in the non-volatile memory 1616, and/or on a removable non-transitory computer readable storage medium such as a CD or DVD.

In this example, the mass storage device 1628 implements and/or stores the example testbench data 104, the example circuit design data 106, and the example simulation data 118.

From the foregoing, it will be appreciated that example systems, methods, apparatus, and articles of manufacture have been disclosed that simulate metastability effects for circuit design verification. The disclosed systems, methods, apparatus, and articles of manufacture improve the efficiency of using a computing device by modeling a physical behavior of physical circuit components when operating in a metastable state. The disclosed systems, methods, apparatus, and articles of manufacture are accordingly directed to one or more improvement(s) in the functioning of a computer.

Example systems, methods, apparatus, and articles of manufacture that simulate metastability effects for circuit design verification are disclosed herein. Further examples and combinations thereof include the following:

Example 1 includes an apparatus comprising an input handler to receive circuit design data indicative of a circuit design, a circuit modeler to generate a simulation model based on the circuit design data, a simulator to simulate operation of the circuit design based on the simulation model, a metastability injector to insert metastability logic into the simulation model during the simulation, and a metastability controller to control the metastability logic during the simulation.

Example 2 includes the apparatus of example 1, wherein the metastability injector is to remove the metastability logic from the simulation model during the simulation, and control the insertion and the removal of the metastability logic during the simulation.

Example 3 includes the apparatus of example 1, further including a clock analyzer to detect a selectable clock path in the circuit design, and wherein the metastability controller is to trigger the insertion of the metastability logic into the simulation model during the simulation in response to the selectable clock path corresponding to a first selected clock path during the simulation.

Example 4 includes the apparatus of example 3, wherein the metastability controller is to trigger removal of the metastability logic from the simulation model in response to the selectable clock path corresponding to a second selected clock path during the simulation.

Example 5 includes the apparatus of example 1, further including a design analyzer to identify one or more circuit elements along a signal path of a signal received at an input of a register in the circuit design, and wherein the metastability controller is to control the metastability logic based on a simulated state of the one or more circuit elements.

Example 6 includes the apparatus of example 5, wherein the one or more circuit elements include a first circuit element, and the metastability controller is to control the metastability logic during the simulation based on a difference between simulated voltage levels at one or more inputs of the first circuit element.

Example 7 includes the apparatus of example 1, further including a domain determiner to identify a first portion of the circuit design as a source domain and a second portion of the circuit design as a destination domain, and determine a number of domain crossing signals output from the source domain and received at the destination domain, and wherein the metastability controller is to control the metastability logic based on the determined number of domain crossing signals.

Example 8 includes the apparatus of example 7, further including a reporter to output a timing violation message for a given domain crossing signal in the circuit design based on a timing violation threshold, and wherein the metastability injector is to adjust the timing violation threshold based on the determined number of domain crossing signals.

Example 9 includes the apparatus of example 8, wherein the metastability injector is to adjust the timing violation threshold further based on a frequency of a simulated clock signal associated with the destination domain.

Example 10 includes a method comprising receiving circuit design data indicative of a circuit design, generating a simulation model based on the circuit design data, simulating operation of the circuit design based on the simulation model, inserting metastability logic into the simulation model during the simulation, and controlling the metastability logic during the simulation.

Example 11 includes the method of example 10, further including removing the metastability logic from the simulation model during the simulation, wherein controlling the metastability logic includes controlling the insertion and the removal of the metastability logic during the simulation.

Example 12 includes the method of example 10, further including detecting a selectable clock path in the circuit design, and triggering the insertion of the metastability logic into the simulation model in response to the selectable clock path corresponding to a first selected clock path during the simulation.

Example 13 includes the method of example 12, further including triggering removal of the metastability logic from the simulation model in response to the selectable clock path corresponding to a second selected clock path during the simulation.

Example 14 includes the method of example 10, further including identifying one or more circuit elements along a signal path of a signal received at an input of a register in the circuit design, wherein controlling the metastability logic is based on a simulated state of the one or more circuit elements.

Example 15 includes the method of example 14, wherein the one or more circuit elements include a first circuit element, and wherein controlling the metastability logic during the simulation is based on a difference between simulated voltage levels at one or more inputs of the first circuit element.

Example 16 includes a non-transitory computer readable medium comprising instructions that, when executed by at least one processor of a computing system, cause the computing system to at least receive circuit design data indicative of a circuit design, generate a simulation model based on the circuit design data, simulate operation of the circuit design based on the simulation model, insert metastability logic into the simulation model during the simulation, and control the metastability logic during the simulation.

Example 17 includes the non-transitory computer readable medium of example 16, wherein the instructions, when executed, cause the computing system to remove the metastability logic from the simulation model during the simulation, wherein controlling the metastability logic includes controlling the insertion and the removal of the metastability logic during the simulation.

Example 18 includes the non-transitory computer readable medium of example 16, wherein the instructions, when executed, cause the computing system to detect a selectable clock path in the circuit design, and trigger the insertion of the metastability logic into the simulation model in response to the selectable clock path corresponding to a first selected clock path during the simulation.

Example 19 includes the non-transitory computer readable medium of example 18, wherein the instructions, when executed, cause the computing system to trigger removal of the metastability logic from the simulation model in response to the selectable clock path corresponding to a second selected clock path during the simulation.

Example 20 includes the non-transitory computer readable medium of example 16, wherein the instructions, when executed, cause the computing system to identify one or more circuit elements along a signal path of a signal received at an input of a register in the circuit design, wherein controlling the metastability logic is based on a simulated state of the one or more circuit elements.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A method comprising:
   inserting metastability logic into a simulation model during a simulation of a circuit design, wherein the metastability logic includes a set of parallel delay paths; and
   simulating operation of the circuit design based on the simulation model that includes the metastability logic.

2. The method of claim 1, wherein:
   the simulation model includes the metastability logic during a first portion of the simulation of the circuit design; and
   the method further comprises removing the metastability logic from the simulation model for a second portion of the simulation of the circuit design.

3. The method of claim 1, further comprising:
   detecting a selectable clock path in the circuit design; and
   inserting the metastability logic into the simulation model in response to the selectable clock path corresponding to a first selected clock path during the simulation of the circuit design.

4. The method of claim 3, further comprising removing the metastability logic from the simulation model in response to the selectable clock path corresponding to a second selected clock path during the simulation.

5. The method of claim 4, further comprising identifying one or more circuit elements along a signal path of a signal received at an input of a register in the circuit design, wherein the inserting of the metastability logic is based on a simulated state of the one or more circuit elements.

6. The method of claim 5, wherein the one or more circuit elements include a first circuit element, and wherein the inserting of the metastability logic during the simulation is based on a difference between simulated voltage levels at one or more inputs of the first circuit element.

7. The method of claim 1, further comprising:
   identifying a first portion of the circuit design as a source domain and a second portion of the circuit design as a destination domain;
   determining a number of domain crossing signals output from the source domain and received at the destination domain; and
   controlling the metastability logic based on the determined number of domain crossing signals.

8. The method of claim 7, further comprising:
   outputting a timing violation message for a given domain crossing signal in the circuit design based on a timing violation threshold; and
   adjusting the timing violation threshold based on the determined number of domain crossing signals.

9. The method of claim 8, wherein adjusting the timing violation threshold is further based on a frequency of a simulated clock signal associated with the destination domain.

10. The method of claim 1, wherein the set of parallel delay paths comprises a set of selectable delay paths, and wherein each delay path of the set of parallel delay paths has a different delay.

11. A non-transitory computer readable medium comprising instructions that, when executed by at least one processor of a computing system, cause the computing system to at least:
    insert metastability logic into a simulation model, wherein the metastability logic includes a set of delay paths, wherein each delay path of the set of delay paths has a different delay; and
    simulate operation of a circuit design based on the simulation model including the metastability logic.

12. The non-transitory computer readable medium of claim 11, wherein the instructions, when executed, cause the computing system to remove the metastability logic from the simulation model during a portion of a simulation.

13. The non-transitory computer readable medium of claim 11, wherein the instructions, when executed, cause the computing system to:
    detect a selectable clock path in the circuit design; and
    insert the metastability logic into the simulation model in response to the selectable clock path corresponding to a first selected clock path during a simulation.

14. The non-transitory computer readable medium of claim 13, wherein the instructions, when executed, cause the computing system to remove the metastability logic from the simulation model in response to the selectable clock path corresponding to a second selected clock path during the simulation.

15. The non-transitory computer readable medium of claim 11, wherein the instructions, when executed, cause the computing system to identify one or more circuit elements along a signal path of a signal received at an input of a register in the circuit design, and wherein the inserting of the metastability logic is based on a simulated state of the one or more circuit elements.

16. The non-transitory computer readable medium of claim 15, wherein the one or more circuit elements include a first circuit element, and wherein the instructions to insert the metastability logic comprise instructions to insert the metastability logic during a simulation based on a difference between simulated voltage levels at one or more inputs of the first circuit element.

17. The non-transitory computer readable medium of claim 11, wherein the instructions, when executed, cause the computing system to:
    identify a first portion of the circuit design as a source domain and a second portion of the circuit design as a destination domain;
    determine a number of domain crossing signals output from the source domain and received at the destination domain; and
    control the metastability logic based on the determined number of domain crossing signals.

18. The non-transitory computer readable medium of claim 17, wherein the instructions, when executed, cause the computing system to:
    output a timing violation message for a given domain crossing signal in the circuit design based on a timing violation threshold; and
    adjust the timing violation threshold based on the determined number of domain crossing signals.

19. The non-transitory computer readable medium of claim 18, wherein the instructions to adjust the timing violation threshold comprise instructions to adjust the timing violation threshold based on the determined number of domain crossing signals and further based on a frequency of a simulated clock signal associated with the destination domain.

20. An apparatus comprising:
a simulator to simulate operation of a circuit design based on a simulation model;
a metastability injector to insert metastability logic that includes a synchronizer that includes a set of selectable delay paths into the simulation model during simulation of the circuit design; and
a metastability controller to control the metastability logic during the simulation of the circuit design.

* * * * *